US012074908B2

(12) United States Patent
Yang et al.

(10) Patent No.: US 12,074,908 B2
(45) Date of Patent: Aug. 27, 2024

(54) CYBER THREAT DECEPTION METHOD AND SYSTEM, AND FORWARDING DEVICE

(71) Applicant: HUAWEI TECHNOLOGIES CO., LTD., Guangdong (CN)

(72) Inventors: Huazhi Yang, Hangzhou (CN); Donghui Wang, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 447 days.

(21) Appl. No.: 17/369,057

(22) Filed: Jul. 7, 2021

(65) Prior Publication Data

US 2021/0344714 A1 Nov. 4, 2021

Related U.S. Application Data

(63) Continuation of application No. PCT/CN2020/110656, filed on Aug. 22, 2020.

(30) Foreign Application Priority Data

Aug. 22, 2019 (CN) .......................... 201910780575.2

(51) Int. Cl.
*H04L 29/06* (2006.01)
*H04L 9/40* (2022.01)
(Continued)

(52) U.S. Cl.
CPC .......... *H04L 63/1491* (2013.01); *H04L 45/66* (2013.01); *H04L 45/745* (2013.01); *H04L 61/103* (2013.01); *H04L 2101/622* (2022.05)

(58) Field of Classification Search
CPC ................ H04L 63/1491; H04L 45/66; H04L 45/745; H04L 61/103; H04L 2101/622;
(Continued)

(56) References Cited

U.S. PATENT DOCUMENTS 9,979,738 B2 * 5/2018 Holland .............. H04W 12/122
10,516,586 B2 * 12/2019 Gandham ........... H04L 63/1466
(Continued)

FOREIGN PATENT DOCUMENTS

CN 1533101 A 9/2004
CN 101552724 A 10/2009
(Continued)

*Primary Examiner* — Wasika Nipa
*Assistant Examiner* — Leynna Truvan
(74) *Attorney, Agent, or Firm* — Fish & Richardson P.C.

(57) ABSTRACT

This application discloses a cyber threat deception method and system, and a forwarding device. The forwarding device obtains a deception target set, where the deception target set includes a deception target, and the deception target includes an unused internet protocol (IP) address or an unopened port number on a used IP address. The forwarding device receives an IP packet from a host, and determines whether a destination party that the IP packet requests to access belongs to the deception target set. If the destination party that the IP packet requests to access belongs to the deception target set, the forwarding device sends the IP packet to a honeypot management server. The forwarding device receives a response packet, returned by the honeypot management server, of the corresponding IP packet. The forwarding device sends the response packet to the host.

20 Claims, 12 Drawing Sheets

(51) Int. Cl.
*H04L 45/00* (2022.01)
*H04L 45/745* (2022.01)
*H04L 61/103* (2022.01)
*H04L 101/622* (2022.01)

(58) Field of Classification Search
CPC ............ H04L 61/2528; H04L 12/4633; H04L 12/4641; H04L 65/40; H04L 63/1408; H04L 29/12424; H04L 61/2535; H04L 29/12216; H04L 29/12264; H04L 29/12339; H04L 45/26; H04L 45/566; H04L 45/74; H04L 45/741; H04L 49/118; H04L 61/2007; H04L 61/2503; H04L 61/2596; H04L 61/5007; H04L 61/50; H04L 63/0236; H04L 45/021; H04L 45/023; G06F 3/1231; G06F 7/4988; G05B 2219/33244; G05B 2219/23334; G03H 2001/0833
See application file for complete search history.

(56) References Cited

U.S. PATENT DOCUMENTS

| | | | |
|---|---|---|---|
| 2005/0050353 A1* | 3/2005 | Thiele | H04L 63/1416 |
| | | | 713/188 |
| 2015/0244739 A1 | 8/2015 | Ben-Shalom et al. | |
| 2017/0223052 A1 | 8/2017 | Stutz | |
| 2017/0353491 A1* | 12/2017 | Gukal | H04L 45/02 |
| 2019/0238589 A1 | 8/2019 | Stutz | |
| 2019/0386969 A1* | 12/2019 | Verzun | G06F 21/606 |

FOREIGN PATENT DOCUMENTS

| | | | | |
|---|---|---|---|---|
| CN | 103139184 A | 6/2013 | | |
| CN | 104021344 A | 9/2014 | | |
| CN | 104113553 A | 10/2014 | | |
| CN | 107809425 A | 3/2018 | | |
| CN | 109302426 A | 2/2019 | | |
| CN | 109413709 A | 3/2019 | | |
| CN | 109768993 A | 5/2019 | | |
| WO | WO-2015174100 A1 * | 11/2015 | | H04L 12/46 |

* cited by examiner

CYBER THREAT DECEPTION METHOD AND SYSTEM, AND FORWARDING DEVICE

CROSS-REFERENCE TO RELATED APPLICATIONS

This application is a continuation of International Application No. PCT/CN2020/110656, filed on Aug. 22, 2020, which claims priority to Chinese Patent Application No. 201910780575.2, filed on Aug. 22, 2019. The disclosures of the aforementioned applications are hereby incorporated by reference in their entireties.

TECHNICAL FIELD

This application relates to the field of computer cyber security technologies, and in particular, to a cyber threat deception method and system, an apparatus, and a forwarding device.

BACKGROUND

With the emergence of next-generation threats such as advanced persistent threat (APT) and ransomware, conventional feature-based security defense means cannot achieve satisfactory effects. For example, the conventional feature-based security defense means cannot identify unknown malware (such as worms and viruses) spread on a network, social engineering attacks, and attacks launched by jumping between a plurality of hosts on an internal network of an enterprise, a school, or a government.

To cope with the foregoing problem, a honeypot-based deception system has been proposed in research. A honeypot is a technique for deceiving attackers. One computer or a group of computers are deployed as bait in the honeypot, and some network services are enabled on the computer/computers or the computer/computers is/are disguised to have stored high-value data, to entice hacker attacks. Surveillance software may also be installed in the honeypot to monitor and deceive behavior performed after malware or hacker intrusion into the honeypot, for subsequent analysis or cracking research. The honeypot may be implemented through an independent server, a virtual machine, or software.

To improve implementation effects of the honeypot, a traffic diversion node for network packets is added to the deception system based on the single honeypot. A typical deception system logically includes three parts: one or more honeypots, a honeypot management server for managing honeypots, and one or more proxies. The one or more honeypots may be implemented by one or more virtual machines. The honeypot management server is configured to manage the one or more honeypots, and provide the proxy with an interface for a honeypot service. The honeypot and the honeypot management server may be implemented by using a same computer. The proxy is usually implemented through a software program. The proxy runs on a plurality of hosts on an internal network, and is configured to send, to the honeypot management server, all packets that access a host in which the proxy is located or a packet that accesses a specified port of a host in which the proxy is located.

In the deception system, software programs for implementing a proxy function need to be installed on a large quantity of hosts, causing relatively high deployment and maintenance costs.

SUMMARY

Embodiments of this application provide a cyber threat deception method, to reduce deployment costs of an existing deception system.

According to a first aspect, a cyber threat deception method is provided. In the method, a forwarding device obtains a deception target set, where the deception target set includes at least one deception target, and the at least one deception target includes an unused Internet Protocol (IP) address or an unopened port number on a used IP address. The forwarding device receives a first IP packet from a first host, and determines whether a destination party that the first IP packet requests to access belongs to the deception target set. If the destination party that the first IP packet requests to access belongs to the deception target set, the forwarding device sends the first IP packet to a honeypot management server. The forwarding device receives a second IP packet returned by the honeypot management server, where the second IP packet is a response packet of the first IP packet; and the forwarding device sends the second IP packet to the first host.

In the threat deception solution provided in this embodiment of this application, in one aspect, the forwarding device simulates, based on an actual network environment, a large quantity of honeypots based on an unused address or an unused port number in a subnet connected to the forwarding device. In another aspect, a deception traffic diversion node is implemented on the forwarding device. In other words, the forwarding device is used as a traffic diversion node in the deception solution. When a host (a host that may be potentially controlled by a hacker or malware) initiates access to a honeypot, the forwarding device creates the deception target set. Then, the forwarding device sends, to the honeypot management server, a packet that requests to access a deception target; and sends, to an initiator of the request, a packet correspondingly returned by the honeypot server. In this way, the host that initiates the access then can normally communicate with a destination party that is requested to access and that is simulated, so that the forwarding device deceives the initiator into considering that there is the destination party that the host requests to access on a network, and the initiator can normally communicate with the destination party that the initiator requests to access. A quantity of forwarding devices on an internal network is usually far less than a quantity of hosts, and in the threat deception solution provided in this application, software programs for implementing a proxy function do not need to be installed on hosts on the internal network. Therefore, in comparison with a threat deception solution in which traffic diversion is implemented on a single real host, this reduces deployment and maintenance costs of a deception system.

Optionally, the forwarding device obtains the deception target set by using one method or a combination of methods. In a possible implementation of the first aspect, the forwarding device obtains an unused IP address when processing an Address Resolution Protocol (ARP) request; and adds, to the deception target set, the unused IP address as a deception target. The forwarding device receives a first ARP packet, where the first ARP packet is an ARP request packet. The forwarding device determines an online status of a destination IP address of the first ARP packet based on an IP address status table, where the IP address status table is used to indicate online statuses one-to-one corresponding to a plurality of IP addresses within a range of a subnet connected to the forwarding device, and the online status is online or offline. If the online status of the destination IP address of the first ARP packet is offline, the forwarding device adds, to the deception target set, the destination IP address of the first ARP request packet as an unused IP address.

When the deception target set obtained by the forwarding device in the process of processing the ARP request is used to receive an IP packet by the forwarding device subsequently, the forwarding device sends, to the honeypot management server, an IP packet whose destination party belongs to the deception target set, and sends a packet returned by the honeypot management server to a host that sends the IP packet, so as to implement a function of a traffic diversion node.

It can be understood that an online status of an IP address used by a request party of the first ARP request packet may be considered as online. Therefore, optionally, in another possible implementation of the first aspect, after the forwarding device receives the first ARP packet, the method further includes: The forwarding device sets, to online, an online status corresponding to a source IP address of the first ARP packet in the IP address status table.

Optionally, an unused IP address in the deception target set may be subsequently assigned to a host on the internal network for use. To ensure normal communication of the host, the deception target set needs to be updated appropriately to prevent a packet related to the IP address from being forwarded, as a deception object, to the honeypot management server. For this case, in another possible implementation of the first aspect, the method further includes: The forwarding device receives a second ARP packet, where the second ARP packet is an ARP reply packet or a gratuitous ARP packet; the forwarding device determines whether the deception target set includes a source IP address of the second ARP packet; and if the deception target set includes the source IP address of the second ARP packet, the forwarding device deletes, from the deception target set, the source IP address that is of the second ARP packet and that is used as an unused IP address.

Optionally, similar to the case of the first ARP packet, the forwarding device may also update the IP address status table after receiving the second ARP packet. In another possible implementation of the first aspect, after the forwarding device receives the second ARP packet, the method further includes: The forwarding device sets, to online, an online status corresponding to the source IP address of the second ARP packet in the IP address status table. In this manner, the forwarding device can update the IP address status table appropriately.

Optionally, in another possible implementation of the first aspect, the forwarding device obtains an unused IP address when processing an IP packet; and adds, to the deception target set, the unused IP address as a deception target. For example, the forwarding device adds a deception target to the deception target set at a plurality of occasions, such as an occasion when the forwarding device queries a routing table and an occasion when the forwarding device queries an ARP table during forwarding the IP packet.

Optionally, that the deception target is obtained during querying the routing table includes: The forwarding device receives a third IP packet, and queries, based on a destination IP address of the third IP packet, the routing table of the forwarding device for a next-hop IP address corresponding to the third IP packet; and if there is no next-hop IP address corresponding to the third IP packet in the routing table, the forwarding device adds, to the deception target set, the destination IP address of the third IP packet as an unused IP address.

Optionally, during querying the routing table, if the forwarding device determines that a destination party of the third IP packet is a deception target, the forwarding device sends the third IP packet to the honeypot management server, to deceive the third IP packet, so as to decoy a sending party of the third IP packet. The forwarding device sends the third IP packet to the honeypot management server; receives, from the honeypot management server, a response packet of the third IP packet; and forwards the response packet.

Optionally, that the deception target is obtained during querying the ARP table includes: If there is a next-hop IP address corresponding to the third IP packet in the routing table, the forwarding device queries the ARP table for a Media Access Control (MAC) address corresponding to the next-hop IP address; if there is no MAC address corresponding to the next-hop IP address in the ARP table, the forwarding device determines an online status of the destination IP address of the third IP packet based on an IP address status table, where the IP address status table is used to indicate online statuses one-to-one corresponding to a plurality of IP addresses within a range of at least one subnet connected to the forwarding device, and the online status is online or offline; and if there is no MAC address corresponding to the next-hop IP address in the ARP table and the online status of the destination IP address of the third IP packet is offline, the forwarding device adds, to the deception target set, the destination IP address of the third IP packet as an unused IP address.

Optionally, during querying the ARP table, if the forwarding device determines that a destination party of the third IP packet is a deception target, the forwarding device sends the third IP packet to the honeypot management server, to deceive the third IP packet, so as to decoy a sending party of the third IP packet. The forwarding device sends the third IP packet to the honeypot management server; receives, from the honeypot management server, a response packet of the third IP packet; and forwards the response packet.

When the deception target set obtained by the forwarding device in the process of processing the IP packet is used to receive an IP packet by the forwarding device subsequently, the forwarding device sends, to the honeypot management server, an IP packet whose destination party belongs to the deception target set, and sends a packet returned by the honeypot management server to a host that sends the IP packet, so as to implement a function of a traffic diversion node.

Optionally, the forwarding device not only determines a deception target in the process of processing the ARP request or in the process of processing the IP packet, to obtain the deception target set, where an unused IP address is used as an example of the deception target, but also may obtain a deception target when processing a first-predetermined-type IP packet (a connection reset (RST) packet), to obtain the deception target set, where an unused port number on a used IP address is used as an example of the deception object. Therefore, in another possible implementation of the first aspect, the forwarding device receives a fourth IP packet, where the fourth IP packet is a RST packet. The forwarding device determines whether the fourth IP packet satisfies a deception condition, where the deception condition includes: Before the fourth IP packet is received, at least one connection establishment (SYN) packet corresponding to the fourth IP packet is received, where a destination IP address of the SYN packet corresponding to the fourth IP packet is the same as a source IP address of the fourth IP packet, and a destination port number of the SYN packet corresponding to the fourth IP packet is the same as a source port number of the fourth IP packet. If the fourth IP packet satisfies the deception condition, the forwarding device uses the source IP address of the fourth IP packet as a used IP address; and adds, to the deception target set, the source port number of the fourth IP packet as an unopened port number on an IP address that is indicated by the source IP address of the fourth IP packet.

Optionally, when the fourth IP packet is the RST packet, a stricter deception condition is set to improve accuracy of determining a deception target. In another possible implementation of the first aspect, the forwarding device determines whether the fourth IP packet satisfies the deception condition, where the deception condition includes: At least one SYN packet corresponding to the fourth IP packet is received previous to a predetermined period of time that is before the fourth IP packet is received, and one or more packets that is or that are received within the predetermined period of time and that has or that have a same source IP address and a source port number as the fourth IP packet is or are all RST packets, where a destination IP address of the SYN packet corresponding to the fourth IP packet is the same as a source IP address of the fourth IP packet, and a destination port number of the SYN packet corresponding to the fourth IP packet is the same as a source port number of the fourth IP packet. If the fourth IP packet satisfies the deception condition, the forwarding device uses the source IP address of the fourth IP packet as a used IP address; and adds, to the deception target set, the source port number of the fourth IP packet as an unopened port number on an IP address that is indicated by the source IP address of the fourth IP packet.

Optionally, in terms of indicating that a destination party requested to access is unreachable, for a User Datagram Protocol (UDP), an Internet Control Message Protocol (ICMP) unreachable packet has a same function as the RST packet. In another possible implementation of the first aspect, the forwarding device receives a fourth IP packet, where the fourth IP packet is an ICMP unreachable packet. The forwarding device determines whether the fourth IP packet satisfies a deception condition, where the deception condition includes: Before the fourth IP packet is received, at least one UDP packet corresponding to the fourth IP packet is received, where a destination IP address of the UDP packet corresponding to the fourth IP packet is the same as a source IP address of the fourth IP packet, and a destination port number of the UDP packet corresponding to the fourth IP packet is the same as a source port number of the fourth IP packet. If the fourth IP packet satisfies the deception condition, the forwarding device uses the source IP address of the fourth IP packet as a used IP address; and adds, to the deception target set, the source port number of the fourth IP packet as an unopened port number on an IP address that is indicated by the source IP address of the fourth IP packet.

Optionally, when the fourth IP packet is the ICMP unreachable packet, a stricter deception condition is set to improve accuracy of determining a deception target. In another possible implementation of the first aspect, the forwarding device determines whether the fourth IP packet satisfies the deception condition, where the deception condition includes: At least one UDP packet corresponding to the fourth IP packet is received previous to a predetermined period of time that is before the fourth IP packet is received, and one or more packets that is or that are received within the predetermined period of time and that has or that have a same source IP address and a source port number as the fourth IP packet is or are all ICMP unreachable packets, where a destination IP address of the UDP packet corresponding to the fourth IP packet is the same as a source IP address of the fourth IP packet, and a destination port number of the UDP packet corresponding to the fourth IP packet is the same as a source port number of the fourth IP packet. If the fourth IP packet satisfies the deception condition, the forwarding device uses the source IP address of the fourth IP packet as a used IP address; and adds, to the deception target set, the source port number of the fourth IP packet as an unopened port number on an IP address that is indicated by the source IP address of the fourth IP packet.

Optionally, in another possible implementation of the first aspect, when the fourth IP packet is a RST packet, if the forwarding device determines that a destination party of the fourth IP packet is a deception target, the forwarding device sends the fourth IP packet to the honeypot management server, to deceive the fourth IP packet, so as to decoy a sending party of the fourth IP packet. The forwarding device sends the fourth IP packet to the honeypot management server; receives, from the honeypot management server, a response packet of the fourth IP packet; and forwards the response packet.

Optionally, in another possible implementation of the first aspect, the foregoing various methods for obtaining a deception target may be used individually, or may be used in combination. For example, the second manner of obtaining a deception target and the third manner of obtaining a deception target may be used in combination. For example, when the fourth IP packet is the RST packet and the forwarding device processes the fourth IP packet in the third manner, if the fourth IP packet does not satisfy the deception condition, the forwarding device processes the fourth IP packet in the second manner. Specifically, if the fourth IP packet does not satisfy the deception condition, the method further includes: The forwarding device queries, based on a destination IP address of the fourth IP packet, a routing table of the forwarding device for a next-hop IP address corresponding to the fourth IP packet; and if there is no next-hop IP address corresponding to the fourth IP packet in the routing table, the forwarding device adds, to the deception target set, the destination IP address of the fourth IP packet as an unused IP address.

Optionally, if there is no next-hop IP address corresponding to the fourth IP packet in the routing table, the method further includes: The forwarding device sends the fourth IP packet to the honeypot management server; and the forwarding device receives, from the honeypot management server, a response packet of the fourth IP packet, and forwards the response packet of the fourth IP packet to the first host.

Optionally, if there is a next-hop IP address corresponding to the fourth IP packet in the routing table, the forwarding device queries an ARP table for a MAC address corresponding to the next-hop IP address. If there is no MAC address corresponding to the next-hop IP address in the ARP table, the forwarding device determines an online status of the destination IP address of the fourth IP packet based on an IP address status table. If there is no MAC address corresponding to the next-hop IP address in the ARP table and the online status of the destination IP address of the fourth IP packet is offline, the forwarding device adds, to the deception target set, the destination IP address of the fourth IP packet as an unused IP address.

If there is no MAC address corresponding to the next-hop IP address in the ARP table and the online status of the destination IP address of the fourth IP packet is offline, the method further includes: The forwarding device sends the fourth IP packet to the honeypot management server; and the forwarding device receives, from the honeypot management server, a response packet of the fourth IP packet, and forwards the response packet of the fourth IP packet to the first host.

When the deception target set obtained by the forwarding device in the process of processing the RST packet is used to receive an IP packet by the forwarding device subsequently, the forwarding device sends, to the honeypot management server, an IP packet whose destination party belongs to the deception target set, and sends a packet returned by the honeypot management server to a host that sends the IP packet, so as to implement a function of a traffic diversion node.

Optionally, when the fourth IP packet is a second-predetermined-type IP packet (for example, the fourth packet is a connection setup acknowledgment (SYN_ACK) packet), the forwarding device determines, based on source address information of the fourth IP packet, whether to delete a deception target from the deception target set, so as to update the deception target set. Correspondingly, in another possible implementation of the first aspect, the method further includes: The forwarding device receives a fourth IP packet, where the fourth IP packet is a SYN-ACK packet; the forwarding device determines whether the deception target set includes a to-be-deleted deception target, where the to-be-deleted deception target is an unopened port number on a used IP address, the used IP address is a source IP address of the fourth IP packet, and the unopened port number is a port number that is indicated by a source port number of the fourth IP packet; and if the deception target set includes the to-be-deleted deception target, the forwarding device deletes the to-be-deleted deception target from the deception target set.

Optionally, in another possible implementation of the first aspect, when the fourth IP packet is the SYN-ACK packet, after the forwarding device updates the deception target set based on source address information of the fourth IP packet, the forwarding device can still determine, in the second manner of obtaining a deception target, whether a destination party of the SYN-ACK packet is a deception target. When the fourth IP packet is the SYN-ACK packet, after the forwarding device receives the fourth IP packet, the method further includes: The forwarding device queries, based on a destination IP address of the fourth IP packet, a routing table of the forwarding device for a next-hop IP address corresponding to the fourth IP packet; and if there is no next-hop IP address corresponding to the fourth IP packet in the routing table, the forwarding device adds, to the deception target set, the destination IP address of the fourth IP packet as an unused IP address.

Optionally, when the fourth IP packet is the SYN-ACK packet, if there is no next-hop IP address corresponding to the fourth IP packet in the routing table, the method further includes: The forwarding device sends the fourth IP packet to the honeypot management server; the forwarding device receives, from the honeypot management server, a response packet of the fourth IP packet, and forwards the response packet of the fourth IP packet to the first host; if there is a next-hop IP address corresponding to the fourth IP packet in the routing table, the forwarding device queries an ARP table for a MAC address corresponding to the next-hop IP address; if there is no MAC address corresponding to the next-hop IP address in the ARP table, the forwarding device determines an online status of the destination IP address of the fourth IP packet based on an IP address status table, where the IP address status table is used to indicate online statuses one-to-one corresponding to a plurality of IP addresses within a range of at least one subnet connected to the forwarding device, and the online status is online or offline; and if there is no MAC address corresponding to the next-hop IP address in the ARP table and the online status of the destination IP address of the fourth IP packet is offline, the forwarding device adds, to the deception target set, the destination IP address of the fourth IP packet as an unused IP address.

Optionally, when the fourth IP packet is the SYN-ACK packet, if the forwarding device determines, when processing the fourth IP packet in the second manner, that the destination party of the fourth IP packet is a deception target, the forwarding device sends the fourth IP packet to the honeypot management server, to deceive the fourth IP packet, so as to decoy a sending party of the fourth IP packet. That is, if there is no MAC address corresponding to the next-hop IP address in the ARP table and the online status of the destination IP address of the fourth IP packet is offline, the forwarding device sends the fourth IP packet to the honeypot management server; receives, from the honeypot management server, a response packet of the fourth IP packet; and forwards the response packet.

The forwarding device updates the deception target set in the process of processing the SYN-ACK packet, thereby improving accuracy of subsequent IP packet deception performed based on an updated deception target set. This avoids the following case: Normal communication of a host is affected if an IP address in the original deception target set is allocated to the host.

Optionally, in another possible implementation of the first aspect, the forwarding device determines, through ARP probing, an online status corresponding to each IP address within the range of the subnet, so as to form an IP address status table. That is, the forwarding device sends an ARP request packet for each of the plurality of IP addresses within the range of the subnet connected to the forwarding device. The forwarding device does not receive an ARP reply packet of a first IP address, and the forwarding device adds the first IP address to the IP address status table, where the first IP address is an IP address of the plurality of IP addresses, and sets a status of the first IP address to offline. The forwarding device receives an ARP reply packet of a second IP address, where the second IP address is an IP address of the plurality of IP addresses; adds the second IP address to the IP address status table; and sets a status of the second IP address to online. In this manner, the forwarding device may maintain the IP address status table, thereby helping determine the deception target set based on the IP address status table.

Optionally, in another possible implementation of the first aspect, the forwarding device forwards a domain name system (DNS) domain name request. The forwarding device intercepts and stops forwarding a first DNS response packet, where the first DNS response packet is a response packet of the DNS domain name request, and the first DNS response packet indicates that a domain name queried by the DNS domain name request does not exist. The forwarding device generates a second DNS response packet, where the second DNS response packet includes an IP address corresponding to the domain name queried by the DNS domain name request, and the IP address corresponding to the domain name is an unused IP address in the deception target set. The forwarding device sends the second DNS response packet. The forwarding device deceives DNS probe behavior of a potential attacker, to achieve better deception effects.

Optionally, in any one of the first aspect or the possible implementations of the first aspect, the deception target set is represented as a deception target table, the deception target table includes at least one entry, each entry of the at least one entry is used to indicate one deception target, and each entry includes an IP address for indicating an unused IP address or includes a combination of an IP address and a port number for indicating an unopened port number on a used IP address. That the forwarding device determines whether a destination party that the first IP packet requests to access belongs to the deception target set includes: The forwarding device determines whether there is an entry that includes a destination IP address of the first IP packet or includes a combination of a destination IP address and a destination port number of the first IP packet in the deception target table; if there is an entry that includes the destination IP address of the first IP packet or the combination of the destination IP address and the destination port number of the first IP packet in the deception target table, the forwarding device determines that the destination party that the first IP packet requests to access belongs to the deception target set; and if there is no entry that includes the destination IP address of the first IP packet or the combination of the destination IP address and the destination port number of the first IP packet in the deception target table, the forwarding device determines that the destination party that the first IP packet requests to access does not belong to the deception target set.

The forwarding device stores the deception target set as a deception target table, so that after the forwarding device subsequently receives an IP packet, the forwarding device determines, based on the deception target table, whether a destination party that the IP packet requests to access belongs to the deception target set, thereby improving deception efficiency.

According to a second aspect, a cyber threat deception apparatus is provided. The cyber threat deception apparatus has a function of implementing the method in any one of the first aspect or the possible implementations of the first aspect. The function may be implemented by hardware, or may be implemented by hardware executing corresponding software. The hardware or the software includes one or more modules corresponding to the foregoing functions.

According to a third aspect, a forwarding device is provided. The forwarding device includes a network interface and at least one processor. The network interface is configured to receive or send a packet. The at least one processor is connected to the network interface, and performs the method in any one of the first aspect or the possible implementations of the first aspect. For details, refer to the foregoing detailed descriptions. Details are not described herein again.

According to a fourth aspect, a cyber threat deception system is provided, including a honeypot management server and at least one forwarding device. Each of the at least one forwarding device performs the method in any one of the first aspect or the possible implementations of the first aspect. For details, refer to the foregoing detailed descriptions. Details are not described herein again.

According to a fifth aspect, a computer-readable storage medium is provided. The computer-readable storage medium is configured to store a computer software instruction used by the foregoing forwarding device. When the computer software instruction is run on a computer, the computer is enabled to perform the method in any one of the first aspect or the possible implementations of the first aspect.

According to a sixth aspect, a computer program product including an instruction is provided. When the instruction is run on a computer, the computer is enabled to perform the method in any one of the first aspect or the possible implementations of the first aspect.

According to a seventh aspect, an embodiment of this application provides a chip, including a memory and a processor. The memory is configured to store a computer instruction, and the processor is configured to invoke the computer instruction from the memory and run the computer instruction, to perform the method in any one of the first aspect and the possible implementations of the first aspect.

BRIEF DESCRIPTION OF DRAWINGS

To describe the technical solutions in the embodiments of this application more clearly, the following briefly describes the accompanying drawings for describing the embodiments. It is clearly that, the accompanying drawings in the following description show merely some embodiments of this application, and a person of ordinary skill in the art may still derive other drawings from these accompanying drawings without creative efforts.

FIG. 3A-1 and FIG. 3A-2 are a flowchart of a method for creating a deception target set according to an embodiment of this application;

DESCRIPTION OF EMBODIMENTS

In some deception systems, a software program for implementing a proxy function needs to be installed on a host on an internal network. A proxy, as a traffic diversion node of a honeypot, sends, to a honeypot management server, a packet that accesses a specified port of a host to which the proxy belongs. In one aspect, when a quantity of proxies is insufficient, deception effects achieved by the honeypot are limited. In another aspect, installing a software program on a large quantity of hosts causes high deployment and maintenance costs.

An embodiment of this application provides a cyber threat deception system, including a forwarding device and a honeypot management server. In comparison with a conventional technology, the system makes an important improvement in terms of a deception object and a traffic diversion node. In one aspect, a forwarding device on an internal network (referred to as a "forwarding device" for brevity in subsequent embodiments) first simulates, based on an actual network environment, a large quantity of honeypots (the "honeypot" herein refers to a non-existent destination-party address resource that is requested to access) by using an unused address or an unopened port on the internal network. In another aspect, the forwarding device is implemented as a traffic diversion node, that is, the forwarding device sends, to the honeypot management server, a packet that requests to access a simulated honeypot, and sends, to an initiator of the request, an IP packet correspondingly returned by the honeypot server, so as to deceive a cyber threat. A quantity of forwarding devices on the internal network is usually far less than a quantity of hosts, and in the threat deception solution provided in this application, software programs for implementing a proxy function do not need to be installed on hosts on the internal network. Therefore, in comparison with a threat deception solution in which traffic diversion is implemented on a single real host, this reduces deployment and maintenance costs of a deception system.

The following describes, with reference to the accompanying drawings, main implementation principles, specific implementations, and corresponding beneficial effects that can be achieved in the technical solutions in the embodiments of this application in detail. A specific operation method in a method embodiment can also be applied to an apparatus embodiment or a system embodiment.

Figure 1:
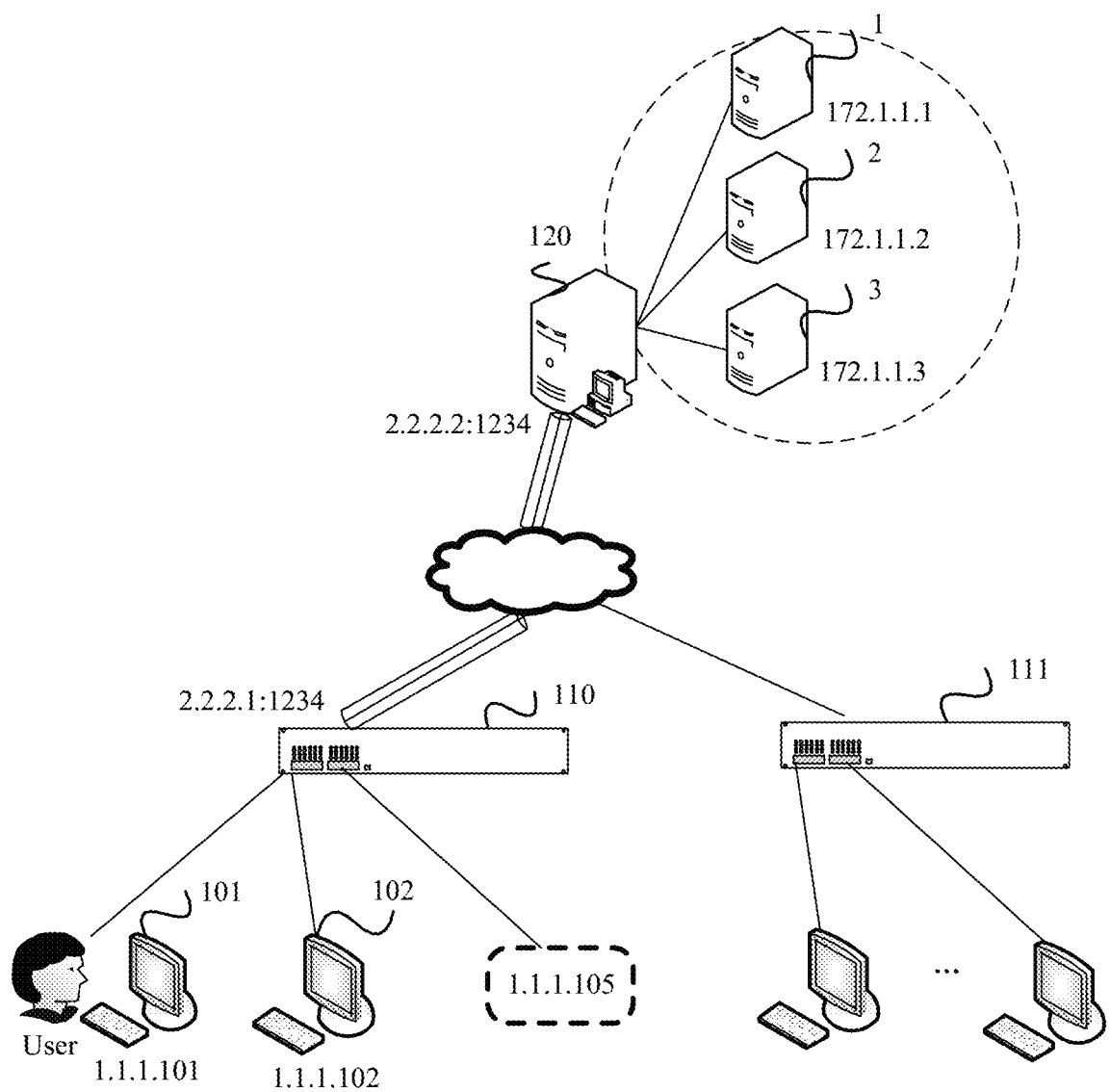
FIG. 1 is a schematic diagram of an application scenario of a cyber threat deception system according to an embodiment of this application.

FIG. 1 is a schematic diagram of an application scenario of a cyber threat deception system according to an embodiment of this application. The cyber threat deception system is used on an internal network. In this embodiment of this application, the internal network includes a local area network of an organization such as a company, a school, or a government department, or a plurality of local area networks connected through a virtual private network (VPN) in an organization. The internal network includes a plurality of hosts, for example, a host 101 and a host 102, a honeypot server 120, and at least one forwarding device, for example, a forwarding device 110 and a forwarding device 111.

The host 101 and the host 102 in FIG. 1 each may be a personal computer, a notebook computer, or the like. An IP address of the host 101 is 1.1.1.101, an IP address of the host 102 is 1.1.1.102, and the host 101 and the host 102 belong to a same subnet within a range of 1.1.1.1-1.1.1.255.

The host 101 and the host 102 are connected through the forwarding device 110. Optionally, the forwarding device 110 is a layer-3 switch. A layer-3 switch is a switch with a layer-3 (a network layer) routing function and a layer-2 (a data link layer) switching function. The layer-3 switch forwards layer-2 traffic based on a MAC address table. The layer-3 switch "looks up a table (a routing table) once and forwards layer-3 traffic for a plurality of times" based on the routing table. The layer-3 switch performs, based on IP addresses, layer-3 routing on a $1^{st}$ data packet between two hosts belonging to different subnets, obtains a MAC address of a destination host according to an ARP learning mechanism, generates a mapping relationship between a MAC address and an IP address, and stores the mapping relationship in an Address Resolution Protocol (ARP) table. The forwarding device 110 may be alternatively a router or a gateway device. This is not specifically limited herein.

The forwarding device 110 is connected to at least one subnet. If the host 101 and the host 102 belong to a same subnet, layer-2 switching may be performed on a packet between the host 101 and the host 102. If the host 101 and the host 102 belong to different subnets, a packet between the host 101 and the host 102 needs to be forwarded through layer-3 routing.

Optionally, a tunnel is established between the forwarding device 110 and the honeypot server 120, where, for example, the tunnel is a User Datagram Protocol (UDP) tunnel, a virtual extensible local area network (VXLAN) tunnel, or a generic routing encapsulation (GRE) tunnel. For example, the forwarding device 110 establishes a tunnel between the forwarding device 110 and the honeypot management server 120 by using an IP address 2.2.2.1 and a port number 1234, and the honeypot management server 120 establishes a tunnel between honeypot management server 120 and the forwarding device 110 by using an IP address 2.2.2.2 and the port number 1234.

The forwarding device 110 sends, to the honeypot management server through tunnel encapsulation, a packet that is sent by a request party and whose destination party is a deception target. Correspondingly, the forwarding device 110 receives, through a tunnel, a packet returned by the honeypot management server; decapsulates the received packet to obtain a packet that is encapsulated and that is returned by a honeypot host; and sends the packet obtained through decapsulation to the request party. In this manner, the forwarding device 110 collaborates with the honeypot server 120, so that the honeypot host simulates a deception target to interact with the request party of the packet.

The honeypot management server 120 is configured to manage one or more honeypots (honeypot hosts), and provide an interface to a client for using a honeypot service. The honeypot management server 120 is further configured to manage the honeypot service. Optionally, the honeypot management server 120 manages at least one honeypot host. With an increase of honeypot service requirements, to meet increasingly higher requirements for service quality, the honeypot management server 120 manages a plurality of honeypot hosts, and the plurality of honeypot hosts may back up with each other and implement load balancing. For example, in FIG. 1, the honeypot management server 120 manages three honeypot hosts: a honeypot host 1, a honeypot host 2, and a honeypot host 3. Optionally, the three honeypot hosts are implemented by using a plurality of virtual machines. Each honeypot host has a corresponding IP address. For example, an IP address of the honeypot host 1 is 172.1.1.1, an IP address of the honeypot host 2 is 172.1.1.2, and an IP address of the honeypot host 3 is 172.1.1.3.

The honeypot management server 120 maps, to one of the three honeypot hosts according to a predetermined algorithm, a destination IP address and a destination port number of a packet received through a tunnel (namely, an inner packet encapsulated in a tunnel packet), performs first replacement based on a mapping result, that is, replaces the destination IP address and the destination port number of the packet that is received through the tunnel with an IP address of the mapped honeypot host and a port number of the mapped honeypot host; and sends a packet generated through the replacement to the mapped honeypot host. For example, a deception target includes an unused IP address 1.1.1.105 in a subnet on the internal network. The forwarding device 110 sends, to the honeypot server, a packet (denoted as a message 1) after tunnel encapsulation, where the packet is a packet on a port number 80 on the IP address 1.1.1.105 that the host 101 accesses. The honeypot server maps the packet to the honeypot host 1 based on the port number 80. The honeypot management server replaces a destination IP address of the message 1 with the IP address 172.1.1.1 of the honeypot host 1, and the destination port number of the message 1 is still 80, to generate a message 1'. The honeypot management server sends, to the honeypot host 1, the message 1' generated through the replacement. In this embodiment, that the honeypot server 120 replaces only a destination IP address of a packet that is received through a tunnel is used as an example for description. In addition, the honeypot server 120 may alternatively replace both a destination IP address and a port number of a packet that is received through a tunnel. A principle of replacement is basically similar to a principle for replacing only a destination IP address, and example descriptions are not provided herein.

In a reverse direction, after receiving the packet returned by the honeypot host, the honeypot management server 120 performs second replacement based on the mapping result, that is, replaces a source IP address and a source port number of the packet returned by the honeypot host with the destination IP address and the destination port number of the packet that is received through the tunnel before the first replacement. The honeypot management server 120 sends a packet generated through the second replacement to the forwarding device through the tunnel. Still refer to the foregoing example. The honeypot management server 120 receives a packet (denoted as a message 2) returned for the message 1 by the honeypot host 1, and replaces a source IP address of the message 2 with 1.1.1.105, and a source port number of the message 2 is still 80. The honeypot management server 120 sends a packet message 2' generated through the replacement to the forwarding device 110 through the tunnel.

Optionally, the foregoing mapping and replacement functions may be centrally performed, as described above, by the honeypot management server, or may be distributedly performed by a plurality of forwarding devices. That is, the foregoing functions of mapping the destination address and the destination port number of the message 1 and replacing an address and a port number of the message 1 and the message 2 based on a mapping result may also be performed by the forwarding device. Specifically, after performing replacement on the message 1, the forwarding device 110 sends, to the honeypot management server through the tunnel, the packet message 1' generated through the replacement, replaces the address and the port of the message 2 that is sent by the honeypot server through the tunnel, and sends the packet message 2' generated through the replacement to the host 101.

In actual application, because the honeypot management server may establish tunnels between the honeypot management server and a plurality of forwarding devices, and provide a honeypot service. Therefore, it is more advantageous for the honeypot management server to centrally perform the foregoing mapping and replacement functions. This facilitates centralized implementation of honeypot management services, for example, increasing or decreasing a quantity of honeypot hosts, and updating an algorithm used to map a destination IP address and a destination port number of a packet to one of the honeypot hosts. However, the manner of distributedly performing the foregoing mapping and replacement functions by a plurality of forwarding devices can prevent the honeypot management server from being a performance bottleneck. Therefore, the two manners of centrally performing the mapping and replacement functions and distributedly performing the mapping and replacement functions have respective advantages, and a network administrator may selectively implement the mapping and replacement functions based on an actual situation.

Figure 2:
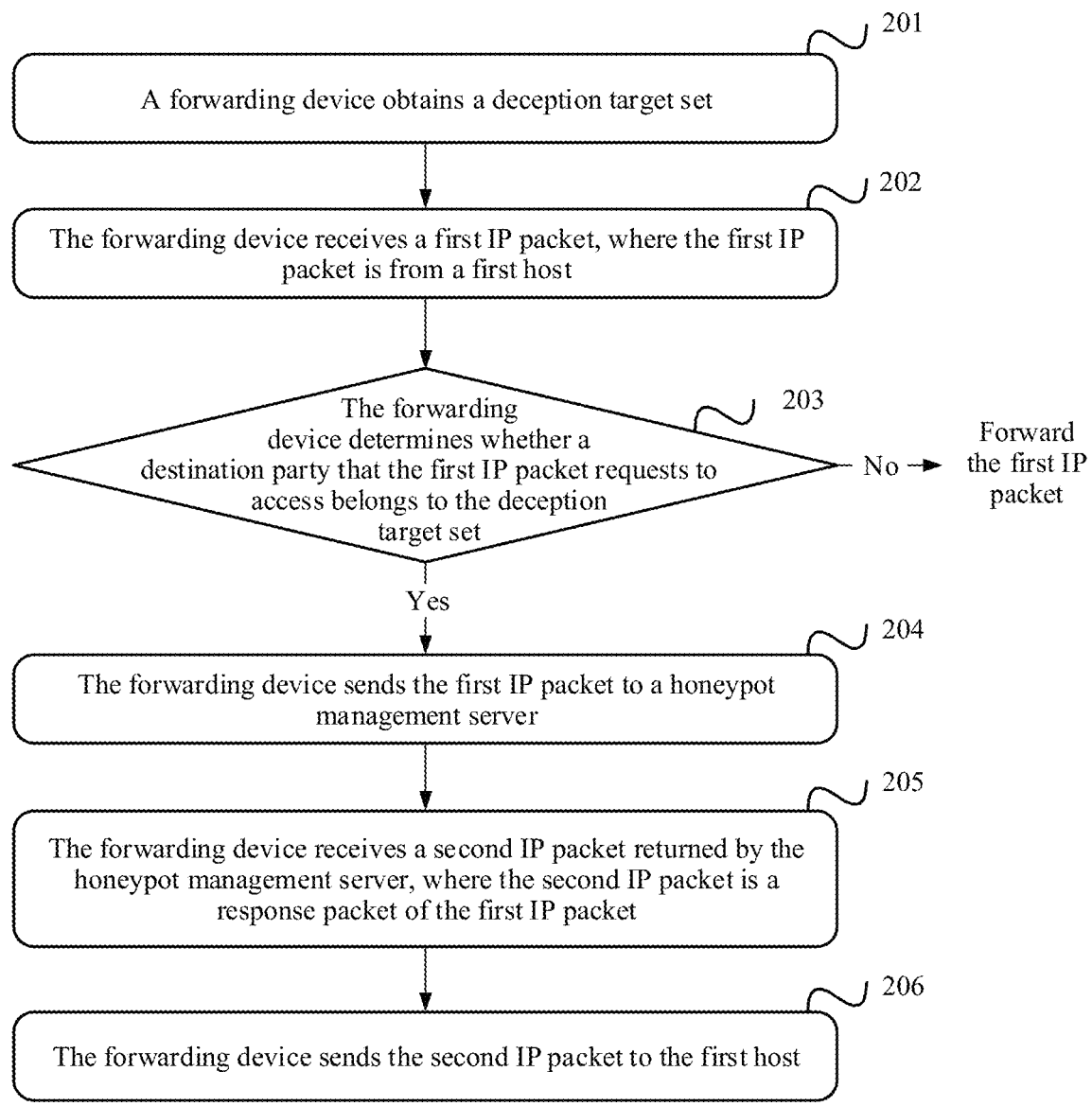
FIG. 2 is a flowchart of a principle for a threat deception method according to an embodiment of this application.

With reference to the application scenario shown in FIG. 1, the following describes a cyber threat deception method provided in an embodiment of this application. FIG. 2 is a flowchart of a principle for the threat deception method according to an embodiment of this application. In FIG. 2, the cyber threat deception method provided in this embodiment of this application is mainly described from a perspective of a forwarding device. Optionally, the forwarding device in FIG. 2 may be the forwarding device 110 in FIG. 1.

Step 201: The forwarding device obtains a deception target set. The deception target set includes at least one deception target, and the at least one deception target includes an unused IP address or an unopened port number on a used IP address. In other words, the at least one deception target may be all unused IP addresses, all unopened port numbers on used IP addresses, or a part of unused IP addresses and a remaining part of unopened port numbers on used IP addresses. An IP address related to the deception target is an IP address within a range of at least one subnet connected to the forwarding device.

In this embodiment of this application, an unused IP address is an IP address relative to a used IP address, and the unused IP address is an IP address that is not assigned to any host on an internal network. A used IP address is an IP address that has been assigned to a host. A port number related to the deception target refers to a logical port number of a computer device. An unopened port number indicates that a host does not use the port number to provide a service for another host on the network.

Optionally, for ease of information storage, searching, and matching, the deception target set is represented as a deception target table. The deception target table includes at least one entry, each entry of the at least one entry is used to indicate one deception target, and each entry includes an IP address or a combination of an IP address and a port number. Table 1 is an example of the deception target table. The deception target table shown in Table 1 includes two entries. A deception target indicated by an entry 1 is an unopened port 80 on an IP address 1.1.1.103, and a deception target indicated by an entry 2 is an unused IP address 1.1.1.105.

TABLE 1

| Entry number | Deception target |
|---|---|
| 1 | 1.1.1.103:80 |
| 2 | 1.1.1.105 |

There may be a plurality of specific manners of obtaining the deception target set. Optionally, when an IP address is assigned in a static configuration manner on the internal network, the forwarding device receives, through an input interface, an unused IP address entered by a network administrator. The input interface of the forwarding device is connected to an input device such as a keyboard. When a dynamic address assignment solution is used on the internal network, a Dynamic Host Configuration Protocol (DHCP) server assigns an IP address to a host on the network, and the forwarding device obtains an unused IP address from the DHCP server.

Optionally, the embodiments of this application further provide a plurality of manners of obtaining the deception target set by the forwarding device through active learning. Details are provided in subsequent embodiments with reference to the accompanying drawings.

Step 202: The forwarding device receives a first IP packet, where the first IP packet is from a first host. For example, the forwarding device is the forwarding device 110 in FIG. 1. The first host is the host 101 in FIG. 1. A source IP address of the first IP packet is an IP address 1.1.1.101 of the host 101.

Step 203: The forwarding device determines whether a destination party that the first IP packet requests to access belongs to the deception target set. The destination party that is requested to access is indicated by a destination IP address or a combination of a destination IP address and a destination port number. Specifically, the forwarding device parses an IP header of the first IP packet, to obtain the destination IP address of the first IP packet or the combination of the destination IP address of the first IP packet and the destination port number of the first IP packet. The forwarding device compares each of the obtained destination IP address of the first IP packet or the obtained combination of the destination IP address and the destination port number of the first IP packet with the entries in the deception target table shown in Table 1. If the obtained destination IP address of the first IP packet or the obtained combination of the destination IP address and the destination port number of the first IP packet is the same as either of the entries, the forwarding device determines that the destination party that the first IP packet requests to access belongs to the deception target set, and performs step 204. If neither the obtained destination IP address of the first IP packet nor the obtained combination of the destination IP address and the destination port number of the first IP packet is the same as either of the entries, the forwarding device determines that the destination party that the first IP packet requests to access does not belong to the deception target, queries a routing table or queries an ARP table and a routing table for a corresponding interface number based on the destination IP address of the first IP packet, and sends the first IP packet through the corresponding interface. Forwarding a packet based on the routing table is an existing function of a switch, and details are not described herein.

Step 204: The forwarding device sends the first IP packet to a honeypot management server. Optionally, the forwarding device sends the first IP packet to the honeypot management server through a tunnel between the forwarding device and the honeypot management server. Specifically, sending the first IP packet through the tunnel means to encapsulate the first IP packet based on a parameter of a pre-established tunnel and a tunnel protocol type. That is, the forwarding device uses the first IP packet as a payload part of a tunnel packet, adds a tunnel protocol packet header to the first IP packet to generate a first tunnel packet, and sends the first tunnel packet to the honeypot management server.

Optionally, the forwarding device and the honeypot management server establish the tunnel between the forwarding device and the honeypot management server according to a plurality of different protocols. The tunnel between the forwarding device and the honeypot management server includes but is not limited to a UDP tunnel, a VXLAN tunnel, a GRE tunnel, or the like.

Step 205: The forwarding device receives a second IP packet returned by the honeypot management server. Optionally, the forwarding device receives the second IP packet through the tunnel, where the second IP packet is a response packet, returned by the honeypot management server, of the first IP packet. Specifically, receiving the second IP packet through the tunnel means to decapsulate, based on the parameter of the tunnel and the tunnel protocol type, a second tunnel packet returned by the honeypot server, to obtain the second IP packet that is included in a payload part of the second tunnel packet.

Step 206: The forwarding device sends the second IP packet to the first host.

The host 101 in FIG. 1 is used as an example. It is assumed that after the host 101 is controlled by a hacker or suffered from network virus infection, the host 101 is used as a springboard to probe or attack another host on the internal network. For example, the host 101 is used to scan another host on the internal network, to attempt to obtain information about the another host, and then attempt to log in to the another host, so as to obtain sensitive information stored in the another host or launch an attack by exploiting a vulnerability on the another host. The host 101 sends an IP packet (denoted as a message 1) to another IP address 1.1.1.103 in a same subnet. A source IP address of the message 1 is the IP address 1.1.1.101 of the host 101, a port number of the message 1 is 1000, a destination IP address of the message 1 is 1.1.1.103, and a destination port number of the message 1 is 80.

After receiving the message 1, the forwarding device 110 searches the deception target table shown in Table 1 based on the destination IP address of the message 1 and the destination port number of the message 1, and determines that a combination of the destination IP address and the destination port number of the message 1 is the same as content of the entry 1. Therefore, a destination party that the message 1 requests to access is a deception target.

The forwarding device 110 encapsulates the message 1 through the tunnel between the forwarding device 110 and the honeypot management server 120, that is, adds a tunnel protocol packet header, and generates a tunnel packet (denoted as a message 1X), where the message 1 is carried in a payload part of the message 1X. A source IP address in the tunnel protocol packet header of the message 1X is an IP address 2.2.2.1 of the forwarding device 110, a source port number is a port number 1234 of the forwarding device 110, a destination IP address in the tunnel protocol packet header of the message 1X is an IP address 2.2.2.2 of the honeypot management server 120, and a destination port number is a port number 1234 of the honeypot management server 120.

The honeypot management server 120 stores a predetermined algorithm. The predetermined algorithm is used to allocate a honeypot host to process the message 1. Optionally, in this embodiment, the predetermined algorithm is used to allocate, based on a preset correspondence between a port number and a honeypot host identifier, a packet that accesses the port number 80 to a honeypot host 1 for processing.

After receiving the message 1X, the honeypot management server 120 decapsulates the message 1X to obtain the message 1 in the payload part of the message 1X. The honeypot management server 120 maps the message 1 to the honeypot host 1 according to the predetermined algorithm and the destination port number 80 of the message 1. The honeypot management server 120 replaces the destination IP address of the message 1 with an IP address 172.1.1.1 of the honeypot host 1, and generates a packet obtained through the replacement, where the packet is denoted as a message 1'. The honeypot management server 120 records a correspondence between the destination IP address 1.1.1.101 before the replacement and the destination IP address 172.1.1.1 after the replacement, and the destination port number remains unchanged. The honeypot management server 120 sends the message 1' to the honeypot host 1.

The honeypot management server 120 receives a response packet message 2, returned by the honeypot host 1, of the message 1'. A source address of the message 2 is the IP address (172.1.1.1) of the honeypot host 1, and a source port number of the message 2 is 80. The honeypot management server 120 replaces the source IP address 172.1.1.1 of the message 2 with 1.1.1.103 based on the previously recorded correspondence, and generates a packet obtained through the replacement, where the packet is denoted as a message 2'. The honeypot management server 120 encapsulates the message 2' through a tunnel between the honeypot management server 120 and the forwarding device 110, that is, adds a tunnel protocol packet header, and generates a tunnel packet (denoted as a message 2X), where the message 2' is carried in a payload part of the message 2X. A destination IP address in the tunnel protocol packet header of the message 2X is the IP address 2.2.2.1 of the forwarding device 110, a destination port number is the port number 1234 of the forwarding device 110, a source IP address in the tunnel protocol packet header of the message 2X is the IP address 2.2.2.2 of the honeypot management server 120, and a source port number is the port number 1234 of the honeypot management server 120.

After receiving the message 2X, the forwarding device 110 decapsulates the message 2X to obtain the message 2' in the payload part of the message 2X. The switch sends the message 2' to the host 101 based on the destination IP address 1.1.1.101 of the message 2'. In this way, the host 101 can normally communicate with a host that is virtualized by the honeypot host 1, where an IP address of the host is 1.1.1.103 and an opened port number of the host is 80.

According to the threat deception solution provided in this embodiment of this application, the forwarding device (for example, a switch) on the internal network simulates, based on an actual network environment, a large quantity of honeypots based on unused addresses or unused port numbers in the subnet connected to the forwarding device. The forwarding device is used as a traffic diversion node in the deception solution. When a host (a host that may be potentially controlled by a hacker or malware) on the internal network initiates access to a honeypot, the forwarding device creates the deception target set. Then, the forwarding device sends, to the honeypot management server, a packet that requests to access a deception target; and sends, to an initiator of the request, a packet correspondingly returned by the honeypot server. In this way, a deception system deceives the initiator into believing that there is a destination party that the initiator requests to access, and that the initiator can normally communicate with the destination party, so that the deception system can obtain behavior of the hacker or the malware during communication. The behavior can be used for analysis or cracking research, and intrusion to another host on the internal network is delayed, so as to deceive cyber threats.

The threat deception solution provided in this embodiment of this application is mainly implemented by the forwarding device, and a proxy does not need to be installed on the host on the internal network. This reduces deployment and maintenance costs of the deception system. In addition, in the threat deception solution provided in this embodiment of this application, an idle address resource on an actual network is used to implement a honeypot, thereby avoiding affecting a normal service on the internal network.

The following describes, with reference to several different embodiments, specific manners in which the forwarding device creates the deception target set and maintains the deception target based on the actual network environment. The manners described in these embodiments may be combined with each other, or some steps may be equivalently replaced, to obtain more embodiments. It should be noted that the manners in which the forwarding device creates the deception target set based on the actual network environment include but are not limited to the following manners.

This embodiment of this application mainly describes three manners in which the forwarding device creates the deception target set based on the actual network environment. In a first manner, when processing an ARP request initiated by a communication request party, the forwarding device obtains a deception target and adds the deception target to the deception target set. In a second manner, when forwarding an IP packet, the forwarding device obtains a deception target and adds the deception target to the deception target set. In a third manner, when processing a first-predetermined-type packet returned for the communication request party during IP session establishment, the forwarding device obtains a deception target and adds the deception target to the deception target set. The first-predetermined-type packet includes a RST packet or an ICMP unreachable packet. In addition, optionally, the forwarding device may further delete a deception target from the deception target set when processing a second-predetermined-type packet, to update the deception target set, where the second-predetermined-type packet is a SYN-ACK packet.

Optionally, when creating the deception target set, the forwarding device may create the deception target set in one manner of creating the deception target set, or create the deception target set in a plurality of manners of creating the deception target set, or may create the deception target set in a manner plus the foregoing manner of updating the deception target set. A network administrator may configure a specific solution to creating the deception target set based on an actual network requirement and a plurality of factors.

Figures 1, 3A:
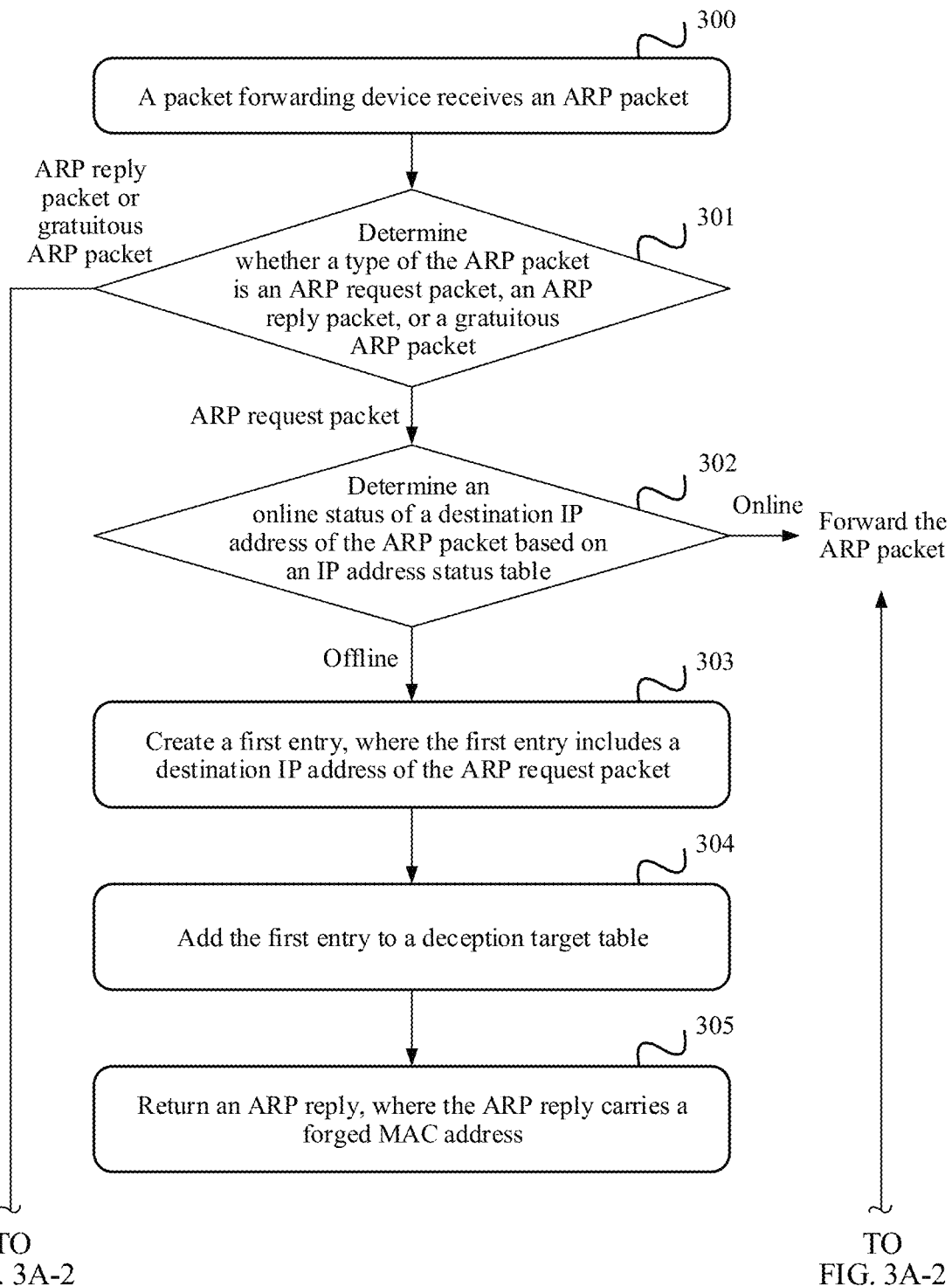
Figures 2, 3A:
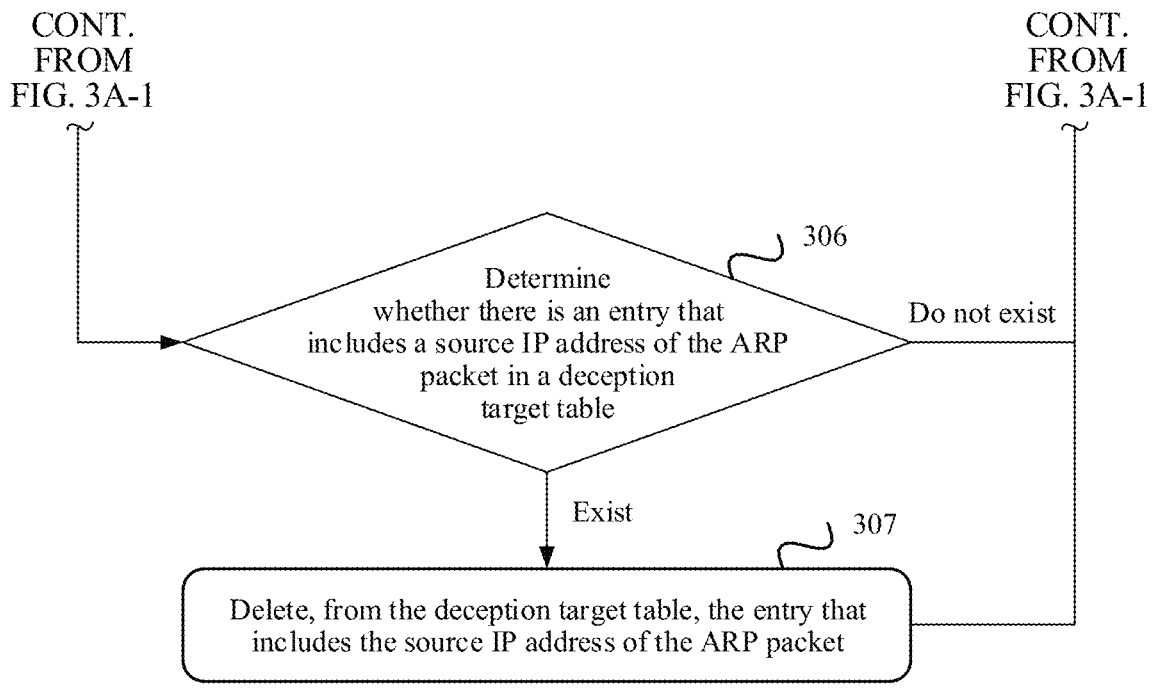

FIG. 3A-1 and FIG. 3A-2 are a flowchart of a method for creating a deception target set according to an embodiment of this application. In FIG. 3A-1 and FIG. 3A-2, the foregoing first manner of creating a deception target set based on an actual network environment is mainly described. To be specific, when processing an ARP request initiated by a communication request party, a forwarding device obtains a deception target and adds the deception target to the deception target set.

Step 300: The forwarding device receives an ARP packet.

An ARP is a protocol used to resolve an IP address into a MAC address (also referred to as a physical address). In a local area network, when a host or another network device needs to send data to another host, a data sending party needs to know an IP address and a MAC address of a receiving party and encapsulate an IP packet into a layer-2 Ethernet frame for transmission through Ethernet. The ARP is used to map an IP address to a MAC address.

An ARP packet has a length of 42 bytes. First 14 bytes are a layer-2 (Ethernet) packet header, which carries a source MAC address, a destination MAC address, and a frame type. An operation type (op) field in last 28 bytes is used to identify whether the ARP packet is an ARP request packet or an ARP reply packet. Specifically, the op field specifies an operation: 1 for an ARP request, 2 for an ARP reply, 3 for an RARP request, and 4 for an RARP reply.

The ARP request packet and the ARP reply packet are used to learn ARP entries corresponding to communication peer ends. If two hosts (a host A and a host B) are in a same subnet, a process in which the host A sends information to the host B includes the following steps. The host A searches an ARP table of the host A based on an IP address of the host B, to determine whether the ARP table of the host A includes an ARP entry corresponding to the host B, where the ARP entry corresponding to the host B includes the IP address of the host B and a MAC address of the host B. If the host A finds the ARP entry corresponding to the host B, the host A obtains the MAC address of the host B from the found entry. The host A uses the MAC address of the host B as a destination MAC address, encapsulates an IP packet into an Ethernet frame, and sends the Ethernet frame to the host B. If the host A does not find the ARP entry corresponding to the host B, the host A broadcasts an ARP request packet. In the ARP request packet, a source IP address and a source MAC address are respectively an IP address of the host A and a source MAC address of the host A, and a destination IP address and a destination MAC address are respectively the IP address of the host B and an all-F MAC address (FFFF.FFFF.FFFF.FFFF) of the host B. All hosts in the subnet receive the ARP request packet. The host B determines, through comparison, that the IP address of the host B is the same as the destination IP address in the ARP request packet. The host B stores, in an ARP table of the host B, the source IP address and the source MAC address in the ARP request packet, generates an ARP reply packet, where the ARP reply packet includes the MAC address of the host B, and sends the ARP reply packet to the host A in a unicast mode.

If the host A and the host B are on different subnets, they need to send packets through a gateway. The host A first sends a packet to the gateway, and then sends the packet to the host B through the gateway. If an ARP table stored in the gateway does not include an ARP entry of the host B, the gateway broadcasts an ARP request packet whose destination IP address is an IP address of the host B, and obtains a MAC address of the host B from a corresponding ARP reply packet.

Therefore, regardless of whether the host A and the host B are on a same subnet, when the host B is a destination party that is requested to access, the host A or the gateway sends the ARP request packet whose destination IP address is the IP address of the host B.

A gratuitous ARP packet is a packet whose source IP address is the same as a destination IP address in the packet. The gratuitous ARP packet is used for the following two purposes. A device that sends the gratuitous ARP packet notifies a neighboring device of ARP information of the device, so that the neighboring device can learn of an ARP entry that includes an IP address and a MAC address of the device, and the neighboring device does not need to send an ARP request again when sending information. The gratuitous ARP packet is used to detect whether there is an IP address conflict. If a device that sends the gratuitous ARP packet receives a response packet of the gratuitous ARP packet, it indicates that an IP address of the device is occupied by another device. A host may send a gratuitous ARP packet when a MAC address of the host or an IP address of the host changes.

Step 301: The forwarding device determines whether a type of the ARP packet is an ARP request packet, an ARP reply packet, or a gratuitous ARP packet. If the packet is the ARP request packet, the forwarding device performs step 302. If the packet is the ARP reply packet or the gratuitous ARP packet, the forwarding device performs step 306.

The forwarding device may determine whether the ARP packet is the ARP request packet or the ARP reply packet based on the op field in the ARP packet. By comparing whether a source IP address in the ARP packet is the same as a destination IP address in the ARP packet, the forwarding device may determine whether the ARP packet is the gratuitous ARP packet. If the source address of the ARP packet and the destination IP address of the ARP packet are the same, the forwarding device determines that the packet is the gratuitous ARP packet.

Step 302: The forwarding device determines an online status of the destination IP address of the ARP packet based on an IP address status table, where the IP address status table is used to indicate online statuses of a plurality of IP addresses within a range of at least one subnet connected to the forwarding device, and the online status is online or offline.

Optionally, the IP address status table may store only an IP address whose online status is offline, or may store both an IP address whose online status is online and an IP address whose online status is offline. If the IP address status table may store only the IP address whose online status is offline, the IP address status table may store only the IP address, and a status of the IP address included in the IP address status table is offline by default. If the IP address status table stores both the IP address whose online status is online and the IP address whose online status is offline, the IP address status table needs to store the IP address and an online status corresponding to each IP address.

Optionally, a process of obtaining the IP address status table is described by using two IP addresses as an example. A first IP address and a second IP address are two IP addresses of the plurality of IP addresses in the subnet connected to the forwarding device. The IP address status table is obtained by performing the following steps. The forwarding device sends an ARP request packet for each of the plurality of IP addresses within the range of the subnet connected to the forwarding device; if the forwarding device does not receive an ARP reply packet of the first IP address, the forwarding device adds the first IP address to the IP address status table, where the first IP address is an IP address of the plurality of IP addresses; and the forwarding device sets a status of the first IP address to offline. Optionally, when the IP address status table stores both the IP address whose online status is online and the IP address whose online status is offline, if the forwarding device receives an ARP reply packet of the second IP address, the forwarding device adds the second IP address to the IP address status table, where the second IP address is an IP address of the plurality of IP addresses; and the forwarding device sets a status of the second IP address to online.

Figure 3B:
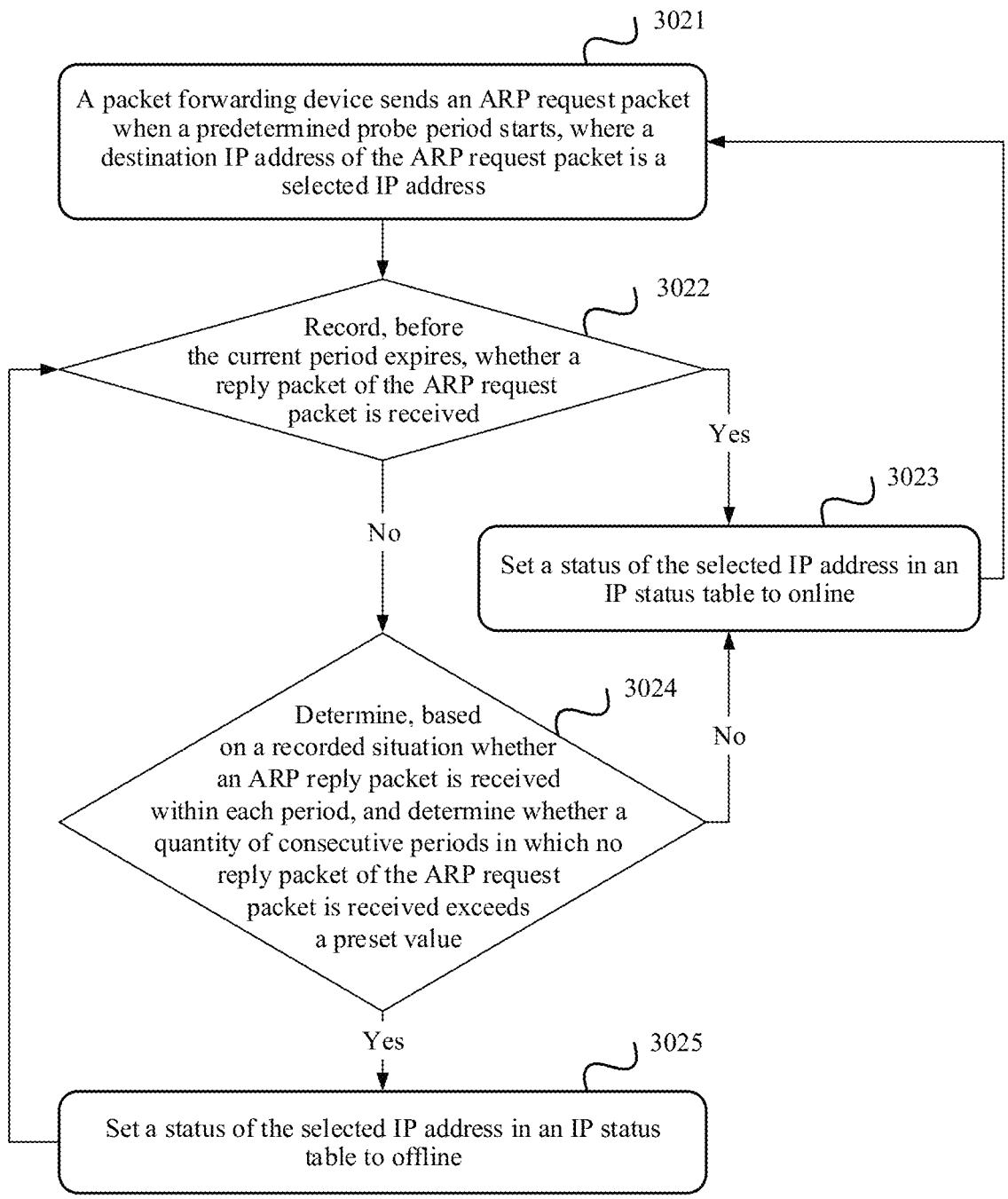
FIG. 3B is a flowchart of a method for obtaining an IP address status table according to an embodiment of this application.

In an actual network scenario, a host may fail to respond to an ARP request packet in a timely manner due to a temporary fault. Optionally, in this scenario, to avoid erroneously adding an IP address used by the host that encounters an occasional fault to the deception target set, the forwarding device may send the ARP request packet to one IP address for a plurality of times. When a predetermined condition (for example, predetermined duration, or a predetermined quantity of consecutive transmission periods) is satisfied, if the forwarding device does not receive a corresponding ARP reply, the forwarding device may add the requested IP address to the deception target set. As shown in FIG. 3B, the IP address status table is obtained by performing steps 3021 to 3025.

The forwarding device is connected to at least one subnet, and each subnet includes a plurality of IP addresses. The forwarding device performs steps 3021 to 3025 for one IP address within the subnet range, to obtain an online status of the IP address. The forwarding device performs a similar process for a plurality of IP addresses within the subnet range, to obtain an IP address status table indicating online statuses of the plurality of IP addresses.

For ease of description, in this embodiment of this application, an example in which a status corresponding to one IP address (that is, a selected IP address) is obtained is used for description. Optionally, the forwarding device constructs, based on a type of a subnet, an IP address space table corresponding to the subnet, where the IP address space table includes all IP addresses in the subnet. Similar steps are performed for each IP address in the IP address space table to obtain an online status. In an implementation process, the forwarding device may sequentially read all the IP addresses from the IP address space table periodically (for example, from 0:00 to 1:00 every day), broadcast an ARP request packet for each IP address that is read, and determine an online status based on an ARP reply packet. The forwarding device may read each IP address in another manner, provided that steps 3021 to 3025 are performed for each IP address to obtain a corresponding online status.

The forwarding device selects one IP address from at least one IP address within the range of the at least one subnet connected to the forwarding device, and performs the following processing for the selected IP address until the following operations are performed for all of the at least one IP address.

Step 3021: The forwarding device sends an ARP request packet when a predetermined probe period starts, where a destination IP address of the ARP request packet is the selected IP address. Optionally, the forwarding device broadcasts the ARP request packet based on the predetermined period by using a timer. Optionally, the probe period may be set to 1 second, 0.1 second, or the like. It is clearly that the probe period should not be set to be a long period, and should be far less than the example predetermined duration of 1 hour.

Step 3022: The forwarding device records, before the current period expires, whether a reply packet of the ARP request packet is received.

The forwarding device records, for each period, whether a corresponding ARP reply packet is received. It is assumed that within one period, if the forwarding device receives the reply packet of the ARP request packet before the period expires, the forwarding device performs step 3023; or if the forwarding device does not receive the reply packet of the ARP request packet before the period expires, the forwarding device performs step 3024.

Step 3023: The forwarding device sets a status of the selected IP address in the IP address status table to online. The procedure goes back to step 3021.

Step 3024: The forwarding device determines, based on a recorded situation whether the ARP reply packet is received for each period, and determines whether a quantity of consecutive periods (for example, 10 periods) in which the reply packet of the ARP request packet is not received exceeds a predetermined value. If the quantity of consecutive periods in which the reply packet of the ARP request packet is not received does not exceed the predetermined value, the forwarding device performs step 3023, to temporarily set the status of the selected IP address to online; or if the quantity of consecutive periods in which the reply packet of the ARP request packet is not received exceeds the predetermined value, the forwarding device performs step 3025.

Step 3025: The forwarding device sets the status of the selected IP address in the IP address status table to offline, and performs step 3021.

Based on the IP address status table generated by performing steps 3021 to 3025, if the forwarding device determines that the online status of the destination IP address of the ARP packet is online, the forwarding device forwards the ARP packet according to an existing ARP packet forwarding procedure. If determining that the online status of the destination IP address of the ARP packet is offline, the forwarding device performs step 303.

Step 303: If the online status of the destination IP address of the ARP packet received in step 300 is offline, the forwarding device adds, to the deception target set, the destination IP address of the ARP request packet as an unused IP address.

Optionally, when the deception target table shown in Table 1 is used to store the deception target set, the forwarding device creates an entry, where the created entry includes the destination IP address of the ARP request packet. The forwarding device further adds the created entry to the deception target table.

In this embodiment of this application, the forwarding device discovers, based on the ARP request packet in which the included destination IP address is an unused IP address, that a host on the internal network attempts to probe, where the host may be a host controlled by a hacker or malware. Then, a target that needs to be simulated by a honeypot system subsequently, namely, a deception target, is determined at this moment.

To enable the host that may be controlled to communicate with the deception target subsequently, after step 302 of determining that the online status of the destination IP address of the ARP packet is offline, and before step 303 of adding the destination IP address of the ARP packet to the deception target set, step 305 is further performed: The forwarding device returns an ARP reply, where the ARP reply carries a pseudo MAC address, where the pseudo MAC address is used as a MAC address of a host that has the destination IP address of the ARP request packet. When the deception target table shown in Table 1 is used to store the deception target set, the forwarding device may also store the pseudo MAC address in the entry created in step 303.

Optionally, if the forwarding device needs to perform the procedure shown in FIG. 3A-1 and FIG. 3A-2 each time the forwarding device receives an ARP request packet, processing load of the forwarding device is increased. To save a processing capability of the forwarding device, a whitelist is set on the forwarding device, where the whitelist includes an IP address or a MAC address of a known host that is used by an authorized user. After step 300 and before step 301, after receiving an ARP packet, the forwarding device first queries the whitelist. If a source IP address of the ARP packet, a source MAC address of the ARP packet, a destination IP address of the ARP packet, or a destination MAC address of the ARP packet is on the whitelist, the forwarding device directly forwards the ARP packet according to the existing ARP packet forwarding procedure. The forwarding device skips performing steps 301 to 303 in FIG. 3A-1.

Optionally, after step 300 in which the forwarding device receives the ARP packet, the IP address used by the host that sends the ARP packet may be considered to be in an online state, and the forwarding device updates the IP address status table based on the source IP address of the ARP packet, and updates the online status corresponding to the source IP address of the ARP packet in the IP address status table to online.

Optionally, in step 301, if the forwarding device determines that the type of the ARP packet is the ARP reply packet or the gratuitous ARP packet, it indicates that the host that sends the ARP reply packet or the gratuitous ARP packet is a normal online host rather than a virtualized host by the honeypot system. As described above, if the destination party that is requested to access is an unused IP address (an offline IP address), the ARP reply packet is actively forged by the forwarding device, instead of being received by the forwarding device. Similarly, an IP address used by a sending party of the gratuitous ARP packet may be considered as an online IP address. Therefore, if the forwarding device determines that the type of the ARP packet is the ARP reply packet or the gratuitous ARP packet, the forwarding device performs step 306. This increases a timing for updating the IP address status table.

Step 306: The forwarding device determines whether the deception target set includes the source IP address of the ARP packet. If there is an entry that includes the source IP address of the ARP packet in the deception target set, the forwarding device performs step 307.

Step 307: The forwarding device deletes, from the deception target set, the source IP address that is of the ARP packet and that is used as an unused IP address. Optionally, when the deception target set is stored in the deception target table shown in Table 1, the forwarding device deletes the entry that includes the source IP address of the ARP packet.

If the forwarding device determines that there is no source IP address of the ARP packet in the deception target set in step 306 or after the forwarding device deletes the source IP address of the ARP packet from the deception target set in step 307, the forwarding device forwards the ARP packet.

By performing step 306 and step 307, the forwarding device may update the deception target set, to avoid using, as a deception target, an IP address used by a host that performs a normal service on the internal network, thereby avoiding affecting a normal service on the internal network.

Optionally, after the deception target set is obtained by performing steps 300 to 307, if an IP packet is received, a source address of the IP packet is an IP address used by a host that sends the IP packet. It is clearly that the source IP address of the IP packet is a used IP address rather than an unused IP address. Therefore, if the deception target set includes the source address of the IP packet, the source address of the IP packet should be deleted from the deception target set. Otherwise, the host that sends the IP packet cannot communicate with another host subsequently.

In this embodiment, the process in which the forwarding device determines, as a deception target, an unused IP address in the subnet connected to the forwarding device. After the forwarding device creates the deception target set by using this method, the forwarding device subsequently implements traffic diversion based on the deception target set.

Figure 4A:
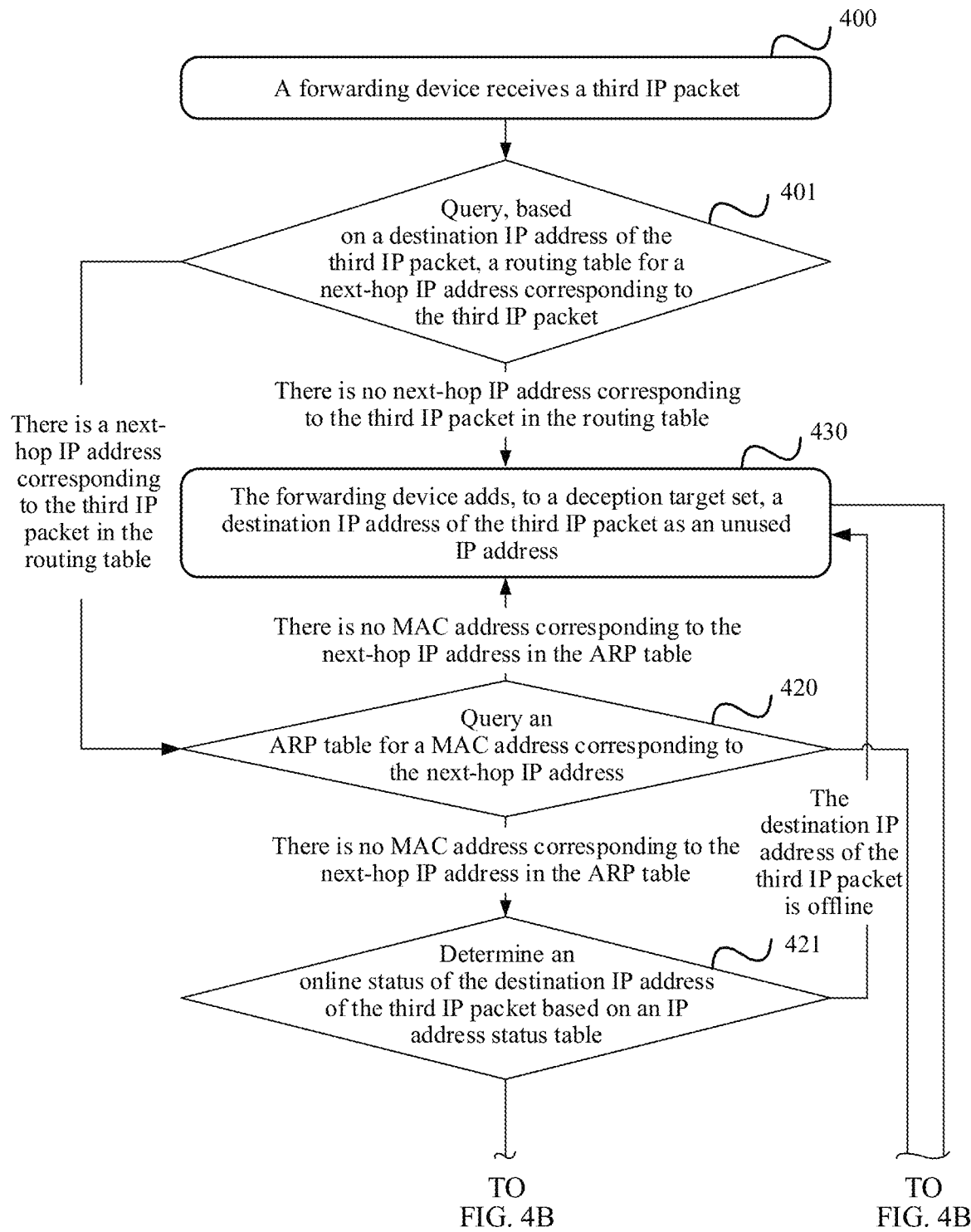
FIG. 4A and FIG. 4B are a flowchart of another method for creating a deception target set according to an embodiment of this application.
Figure 4B:
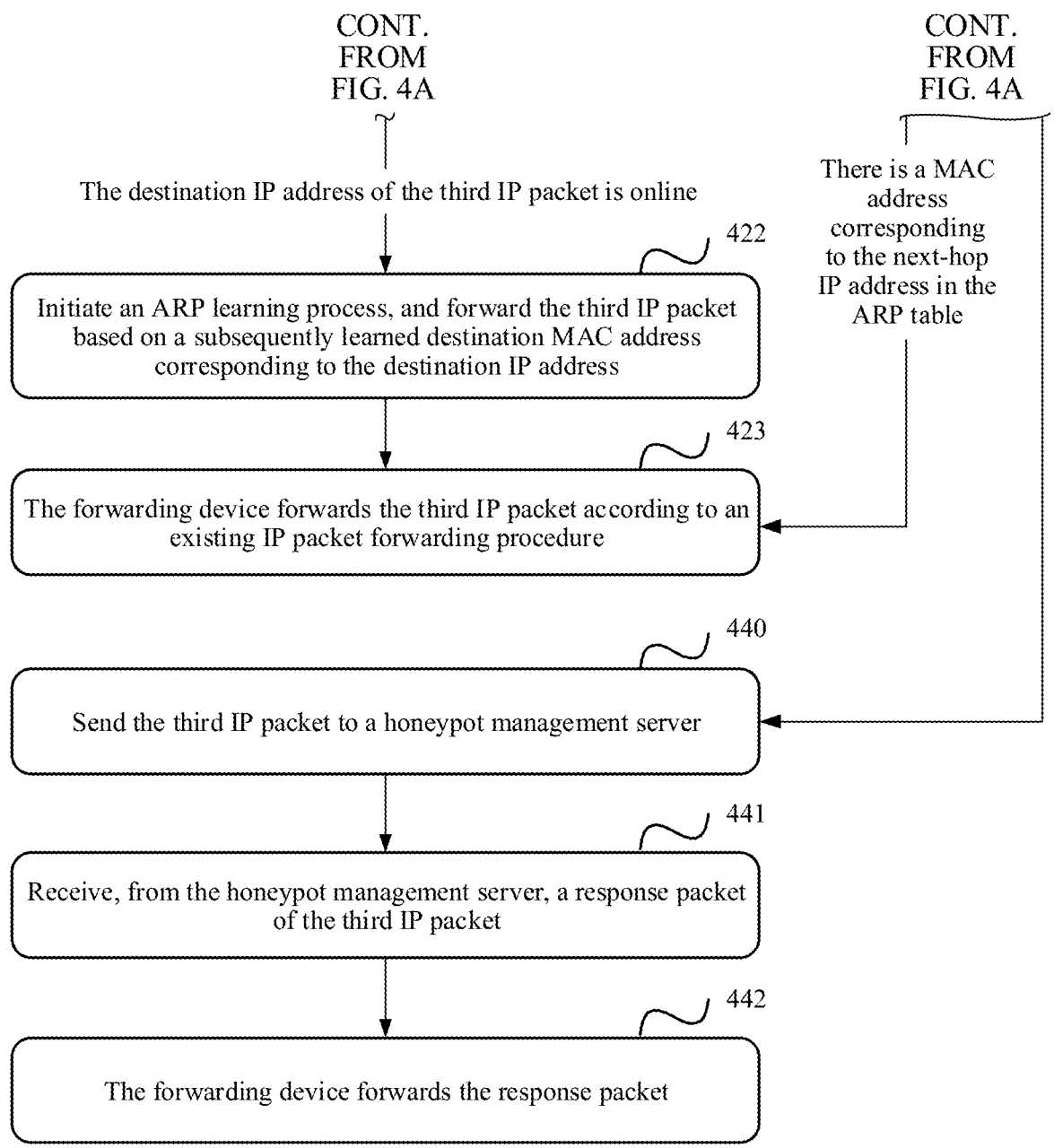

FIG. 4A and FIG. 4B are a flowchart of another method for creating a deception target set according to an embodiment of this application. In FIG. 4A and FIG. 4B, the foregoing second manner of creating a deception target set based on an actual network environment is mainly described. To be specific, when forwarding an IP packet, a forwarding device obtains a deception target and adds the deception target to the deception target set.

Step 400: The forwarding device receives an IP packet. The procedure shown in FIG. 4A and FIG. 4B may be implemented individually, or may be combined with the procedure shown in FIG. 2 or FIG. 3A-1 and FIG. 3A-2. To distinguish the second IP packet in the procedure shown in FIG. 2 from a second IP packet used in a combination of the procedure shown in FIG. 4A and FIG. 4B and the procedure shown in FIG. 2 or FIG. 3A-1 and FIG. 3A-2, the packet received in step 400 in FIG. 4A is referred to as a third IP packet. It should be noted that the third IP packet is not the second IP packet in FIG. 2. The third IP packet may be the first IP packet in FIG. 2, or may be an IP packet different from the first IP packet and the second IP packet.

Step 401: The forwarding device queries, based on a destination IP address of the third IP packet, a routing table of the forwarding device for a next-hop IP address corresponding to the third IP packet. If there is a next-hop IP address corresponding to the third IP packet in the routing table, the forwarding device performs step 420. If there is no next-hop IP address corresponding to the third IP packet in the routing table, the forwarding device performs step 430.

Step 420: The forwarding device queries an ARP table for a MAC address corresponding to the next-hop IP address. If there is no MAC address corresponding to the next-hop IP address in the ARP table, the forwarding device performs step 421. If there is a MAC address corresponding to the next-hop IP address in the ARP table, the forwarding device performs step 423.

Step 421: The forwarding device determines an online status of the destination IP address of the third IP packet based on an IP address status table. For a manner of obtaining the IP address status table, refer to the descriptions in the foregoing embodiment. Details are not described herein again.

If the online status of the destination IP address of the third IP packet is online, the forwarding device performs step 422. If the online status of the destination IP address of the third IP packet is offline, the forwarding device performs step 430.

Step 422: The forwarding device initiates an ARP learning process, and forwards the third IP packet based on a destination MAC address that is subsequently learned of That is, the forwarding device performs step 423.

Step 423: The forwarding device forwards the third IP packet according to an existing IP packet forwarding procedure.

Step 430: The forwarding device adds, to the deception target set, the destination IP address of the third IP packet as an unused IP address. Optionally, when the deception target table shown in Table 1 is used to store the deception target set, the forwarding device creates an entry. The created entry includes the destination IP address of the third IP packet. The forwarding device further adds the created entry to the deception target table.

Optionally, after obtaining the deception target table based on the procedure shown in FIG. 4A and FIG. 4B, the forwarding device may further deceive the third IP packet, that is, perform steps 440 to 442.

Step 440: The forwarding device sends the third IP packet to the honeypot management server.

Step 441: The forwarding device receives, from the honeypot management server, a response packet of the third IP packet.

Step 442: The forwarding device forwards the response packet.

Because the deception process described in steps 440 to 442 is similar to that described in the foregoing embodiment, for example, similar to the process described in steps 204 to 206 in FIG. 2, details are not described herein again.

Figure 5A:
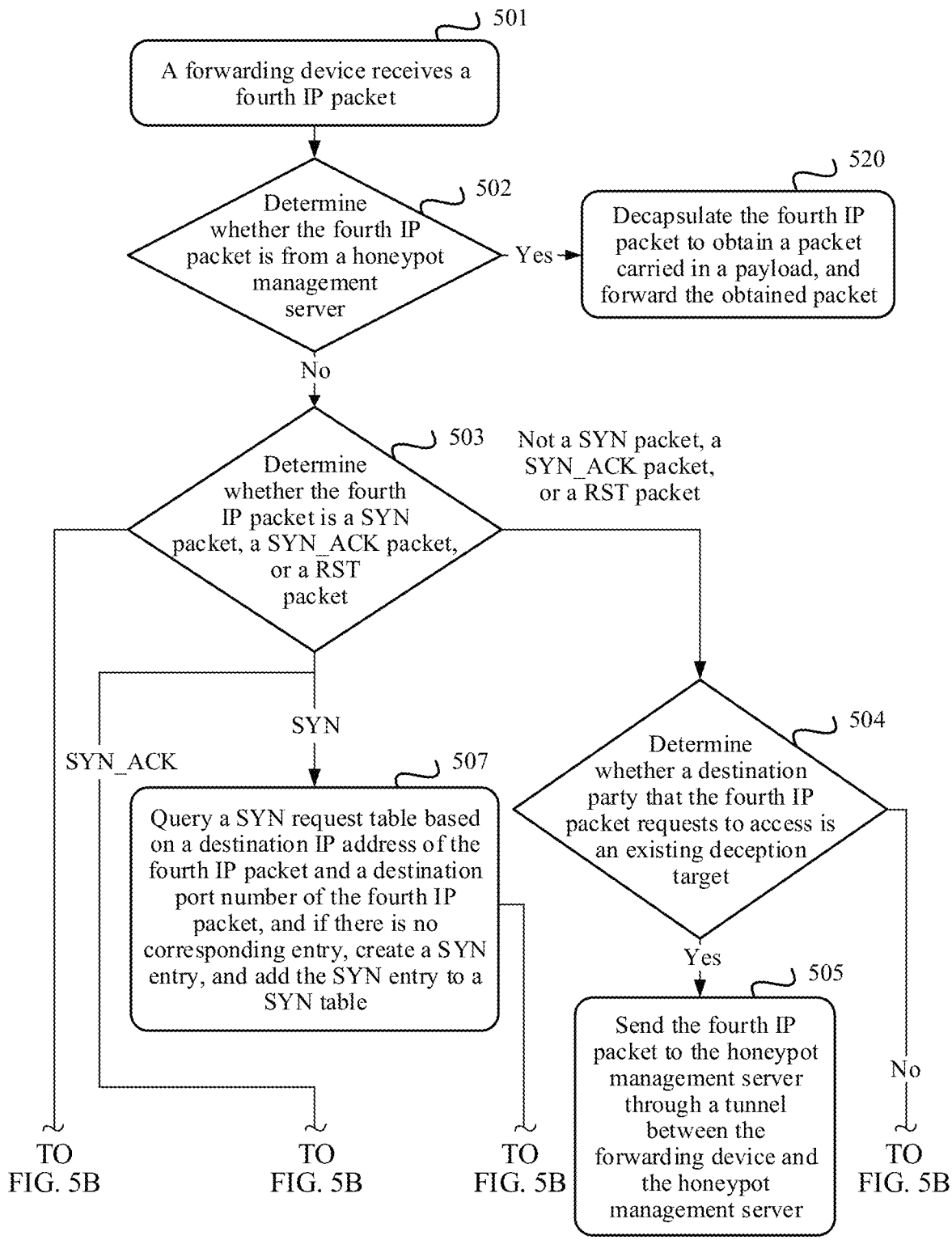
FIG. 5A to FIG. 5C are a flowchart of another method for creating a deception target set according to an embodiment of this application.
Figure 5B:
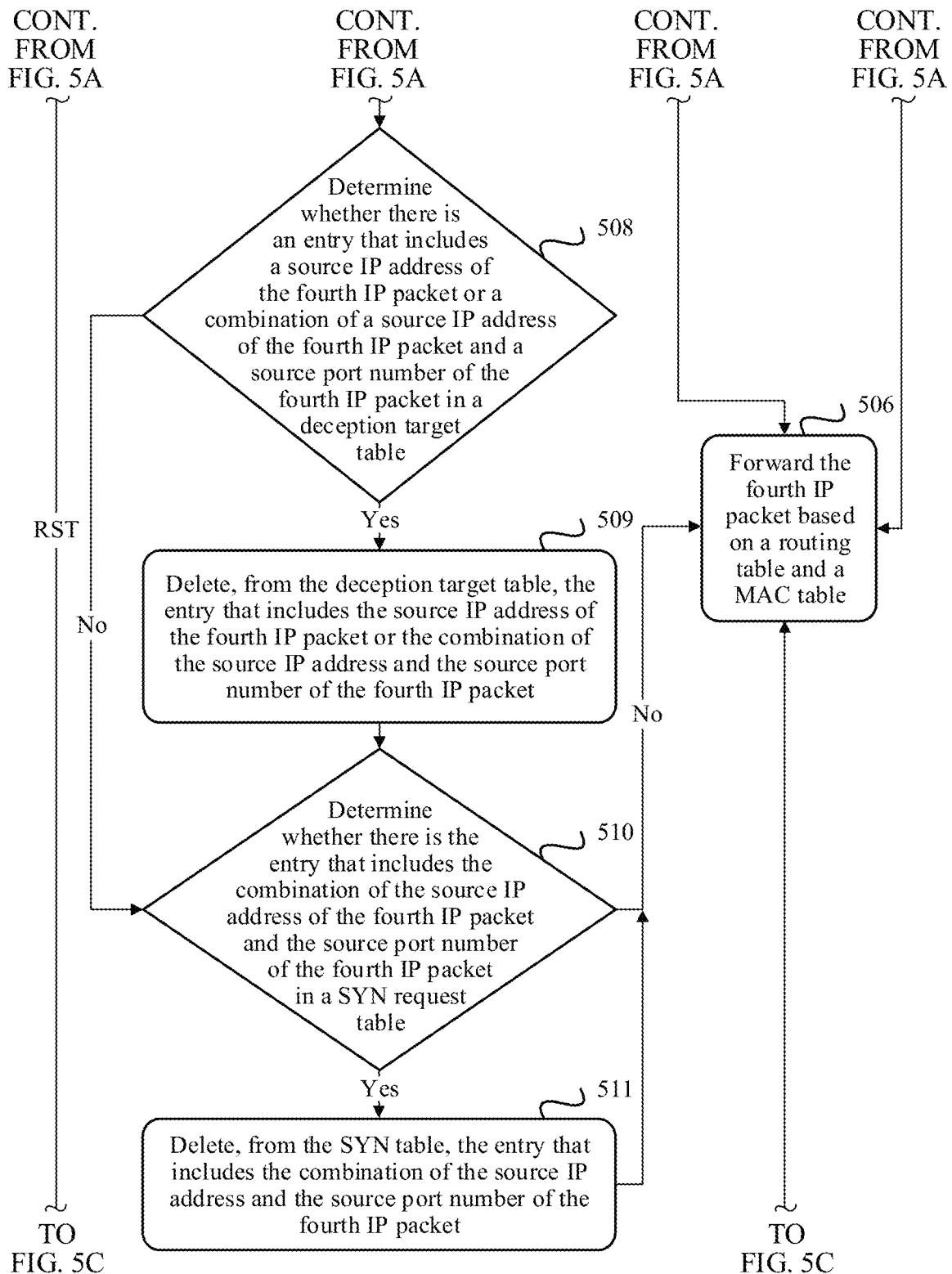
Figure 5C:
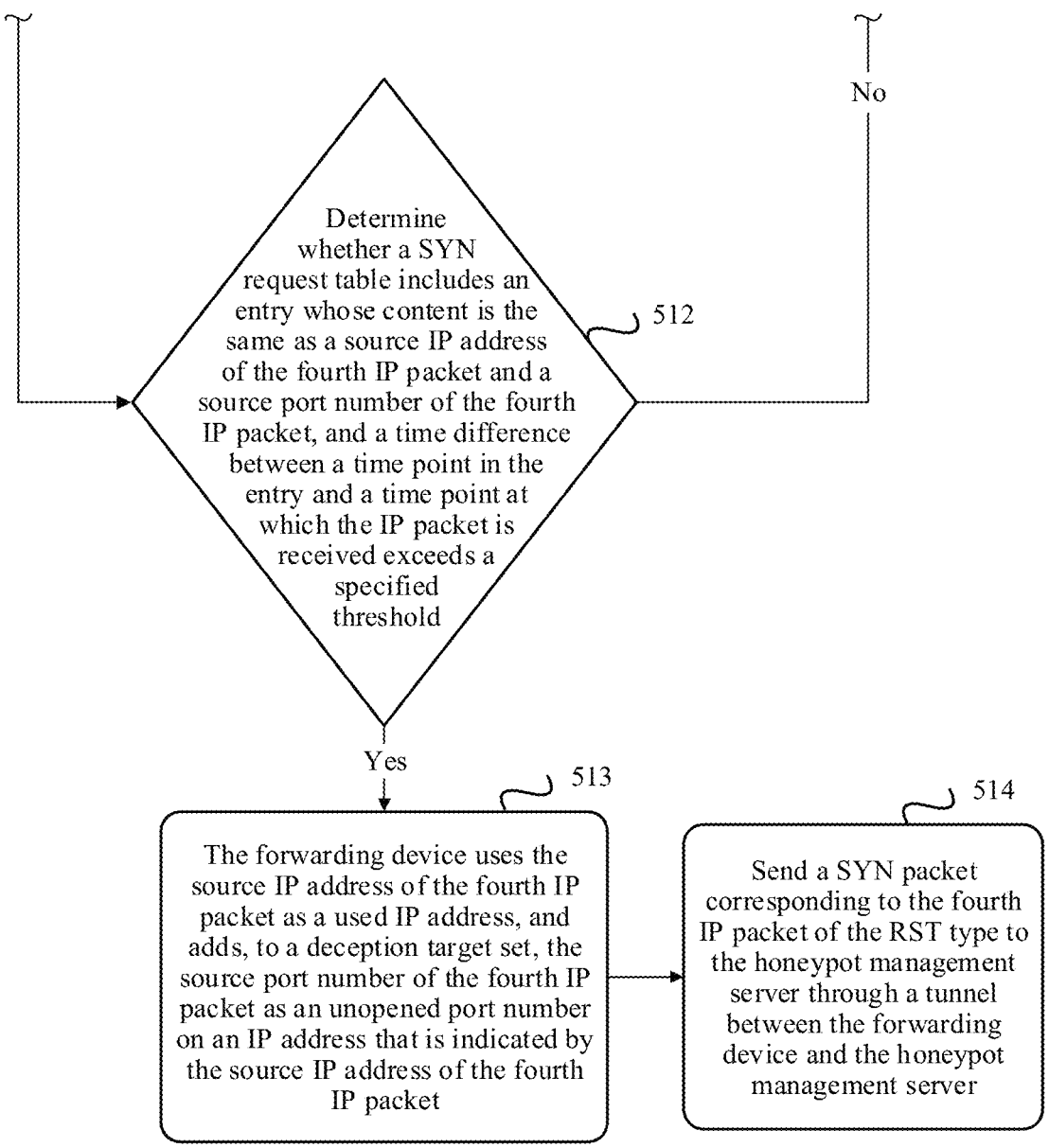

FIG. 5A to FIG. 5C are a flowchart of another specific manner of creating a deception target set according to an embodiment of this application. In FIG. 5A to FIG. 5C, the foregoing third manner of creating a deception target set based on an actual network environment is mainly described. To be specific, when processing a first-predetermined-type packet (namely, a RST packet or an ICMP unreachable packet returned for a communication request party during IP session establishment), a forwarding device obtains a deception target and adds the deception target to the deception target set. The procedure shown in FIG. 5A to FIG. 5C may be implemented individually, or may be combined with the procedure shown in FIG. 2, FIG. 3A-1 and FIG. 3A-2, or FIG. 4A and FIG. 4B. To distinguish the second IP packet in the procedure shown in FIG. 2 from a second IP packet used in a combination of the procedure shown in FIG. 5A to FIG. 5C and the procedure shown in FIG. 2 or FIG. 3A-1 and FIG. 3A-2, a packet received in step 501 in FIG. 5A is referred to as a fourth IP packet. It should be noted that the fourth IP packet is not the second IP packet in FIG. 2. The fourth IP packet may be the first IP packet in FIG. 2, or may be the third IP packet in FIG. 4A and FIG. 4B, or may be an IP packet different from the first IP packet, the second IP packet, and the third IP packet.

In the method shown in FIG. 5A to FIG. 5C, a process of determining an unopened port on a used IP address within the range of the subnet as a deception target is mainly described. The procedure shown in FIG. 5A to FIG. 5C is a process of adding the unopened port on the used IP address to the deception target set based on a known deception target set that includes an unused IP address in the subnet. A process of individually determining the deception target set that includes the unopened port on the used IP address includes a sub-procedure including steps 503 to 513 in FIG. 5A to FIG. 5C. In the method shown in FIG. 5A to FIG. 5C, the deception target set is created during TCP session establishment.

Step 501: The forwarding device receives the fourth IP packet. For example, the forwarding device is the forwarding device 110 in FIG. 1. The forwarding device is connected to several hosts in a subnet through a plurality of interfaces, and is connected to the honeypot management server 120. Optionally, the forwarding device may be further connected, through some interfaces of the forwarding device, to other forwarding devices such as gateways or other switches.

For example, the forwarding device is the forwarding device 110 in FIG. 1. The forwarding table stores a plurality of forwarding entries, and each forwarding entry includes a correspondence between an interface identifier of one interface on one switch and a MAC address of another device that is connected to the interface.

Step 502: The forwarding device determines whether the received fourth IP packet is from a honeypot management server. Optionally, because the forwarding device knows an IP address and a MAC address of the honeypot management server, if a MAC address corresponding to an interface through which the fourth IP packet is received is the same as the MAC address of the honeypot management server, the forwarding device may determine that the fourth IP packet is from the honeypot management server. Otherwise, if a MAC address corresponding to an interface through which the fourth IP packet is received is different from the MAC address of the honeypot management server, the forwarding device may determine that the fourth IP packet is not from the honeypot management server.

If the received fourth IP packet is from the honeypot management server, the fourth IP packet is sent through a tunnel between the forwarding device and the honeypot management server. The forwarding device decapsulates the fourth IP packet to obtain a packet carried in a payload of the fourth IP packet, and forwards the obtained packet, that is, performs step 520.

If the received IP packet is not from the honeypot management server, the forwarding device performs step 503.

Step 503: The forwarding device determines whether the fourth IP packet is a SYN packet, a SYN_ACK packet, or a RST packet.

A header of a TCP packet includes six 1-bit flags (flag): URG, ACK, PSH, RST, SYN, and FIN. When the flags in the header of the TCP packet each are set to 1, it indicates that meanings of the flags are valid. The meanings of these flags are as follows: URG indicates that an urgent pointer field in the TCP packet header is significant; ACK indicates that an acknowledgment field is significant, that is, indicates that the TCP packet is a response packet; PSH indicates a push function, used to request buffered data to push into a receiving application, that is, indicates that there is data transmission; RST indicates resetting a connection. SYN indicates synchronizing a sequence number, that is, indicates establishing a connection; and FIN indicates that the TCP packet is a last packet from a sending party, that is, indicates terminating a connection.

A packet for which only the flag SYN among the six flags is set to 1 is referred to as a SYN packet, a packet whose flags SYN and ACK flag are both set to 1 is referred to as a SYN_ACK packet, and a packet whose flag RST is set to 1 is referred to as a RST packet.

Specifically, packets of a TCP protocol connection establishment process include a SYN packet, a SYN_ACK packet, and a RST packet. The SYN and the SYN_ACK packets are packets of a three-way handshake process, and the three-way handshake is used to establish a TCP connection between two communication parties. The reset (RST) packet is used to reset a connection that is abnormally closed. A TCP protocol stack processing program on a host sends a RST packet when the host considers that an exception occurs. For example, when a host A initiates a connection to a host B, but the host B does not open a port for listening to a connection request of the host A, a TCP protocol stack processing program on the host B sends a RST packet.

If the fourth IP packet is not a packet of the TCP protocol connection establishment process, but the fourth IP packet is an IP packet that is sent after the TCP connection is established and that is used for service data transmission, the forwarding device performs step 504. If the fourth IP packet is the SYN packet, the forwarding device performs step 507. If the fourth IP packet is the SYN_ACK packet, the forwarding device performs step 508. If the fourth IP packet is the RST packet, the forwarding device performs step 512.

In addition to the TCP protocol, the IP protocol also includes a UDP protocol. When processing the UDP protocol, if a host receives a UDP packet whose destination port number is different from a port number corresponding to a process that is being used on the host, the host returns an ICMP unreachable packet. Therefore, the ICMP unreachable packet has a function similar to that of the RST packet, that is, indicates that a port number that is requested to access is unopened. Therefore, the ICMP unreachable packet and the RST packet are described together in a subsequent embodiment.

Optionally, if the forwarding device needs to perform the procedure shown in FIG. 5A to FIG. 5C each time the forwarding device receives an ARP request packet, processing load of the forwarding device is increased. To save a processing capability of the forwarding device, a whitelist is set on the forwarding device. The whitelist includes an IP address or a MAC address of a known host used by an authorized user. After step 501 and before step 503, after receiving an IP packet, the forwarding device first queries the whitelist. If a source IP address of the IP packet, a source MAC address of the IP packet, a destination IP address of the IP packet, or a destination MAC address of the IP packet is on the whitelist, the forwarding device directly forwards the IP packet according to an existing IP packet forwarding procedure. The forwarding device does not need to identify whether the IP packet is the SYN packet, the SYN_ACK packet, or the RST packet, and does not need to perform a subsequent procedure, that is, skips performing step 503 and subsequent steps.

Step 504: The forwarding device determines whether a destination party that the fourth IP packet requests to access is an existing deception target, that is, whether the fourth IP packet should be deceived. For specific implementation details of this step, refer to the descriptions in step 203 in FIG. 2. Details are not described herein again. If the destination party that the fourth IP packet requests to access is the existing deception target, the forwarding device performs step 505. If the destination party that the fourth IP packet requests to access is not the existing deception target, the forwarding device performs step 506.

Step 505: The forwarding device sends the fourth IP packet to the honeypot management server through the tunnel between the forwarding device and the honeypot management server. For specific implementation details of this step, refer to the descriptions in step 204 in FIG. 2. Details are not described herein again.

Step 506: The forwarding device forwards the fourth IP packet based on a MAC table, or forwards the fourth IP packet based on a routing table and an ARP table. Specifically, if the MAC table of the forwarding device stores an interface number corresponding to a destination MAC address of the IP packet, the forwarding device finds, based on the MAC table, an interface corresponding to the destination MAC address of the IP packet, and sends the IP packet through the corresponding interface. If the MAC table of the forwarding device does not store an interface number corresponding to a destination MAC address of the IP packet, the forwarding device forwards the IP packet based on the routing table and the ARP table.

Optionally, when the procedure shown in FIG. 4A and FIG. 4B is used in combination with the procedure shown in FIG. 5A to FIG. 5C, the forwarding device performs the processing procedure shown in FIG. 4A and FIG. 4B on the fourth IP packet in step 506. In other words, the packet received in step 400 in FIG. 4A is an IP packet received by the forwarding device 110 in FIG. 1 through any interface, or may be the fourth IP packet in step 506 in FIG. 5B.

As described in the foregoing embodiment, the deception target further includes an unopened port on a used IP address. If the fourth IP packet satisfies the following deception condition, it indicates that the destination party of the fourth IP packet is an unopened port on a used IP address. The deception condition is as follows: Before the fourth IP packet is received, at least one SYN packet corresponding to the fourth IP packet is received, where a destination IP address of the SYN packet corresponding to the fourth IP packet is the same as a source IP address of the fourth IP packet, and a destination port number of the SYN corresponding to the fourth IP packet is the same as a source port number of the fourth IP packet. If the fourth IP packet satisfies the deception condition, the forwarding device uses the source IP address of the fourth IP packet as a used IP address; and adds, to the deception target set, the source port number of the fourth IP packet as an unopened port number on an IP address that is indicated by the source IP address of the fourth IP packet.

In actual application, the forwarding device may use a stricter deception condition to improve accuracy of determining a deception target. For example, the deception condition is as follows: At least one SYN packet corresponding to the fourth IP packet is received previous to a predetermined period of time that is before the fourth IP packet is received, and one or more packets that is or that are received within the predetermined period of time and that has or that have a same source IP address and a source port number as the fourth IP packet is or are all RST packets, where a destination IP address of the SYN packet corresponding to the fourth IP packet is the same as the source IP address of the fourth IP packet, and a destination port number of the SYN packet corresponding to the fourth IP packet is the same as the source port number of the fourth IP packet.

In terms of indicating that a destination party that is requested to access is unreachable, for the UDP protocol, the ICMP unreachable packet has a similar function as the RST packet. If the fourth IP packet is an ICMP unreachable packet, the corresponding deception condition includes: Before the fourth IP packet is received, at least one UDP packet corresponding to the fourth IP packet is received, where a destination IP address of the UDP packet corresponding to the fourth IP packet is the same as the source IP address of the fourth IP packet, and a destination port number of the UDP packet corresponding to the fourth IP packet is the same as the source port number of the fourth IP packet. If the fourth IP packet satisfies the deception condition, the forwarding device uses the source IP address of the fourth IP packet as a used IP address; and adds, to the deception target set, the source port number of the fourth IP packet as an unopened port number on an IP address that is indicated by the source IP address of the fourth IP packet.

Similarly, when the fourth IP packet is the ICMP unreachable packet, a stricter deception condition includes: At least one UDP packet corresponding to the fourth IP packet is received previous to a predetermined period of time that is before the fourth IP packet is received, and one or more packets that is or that are received within the predetermined period of time and that has or that have a same source IP address and a source port number as the fourth IP packet is or are all ICMP unreachable packets, where a destination IP address of the UDP packet corresponding to the fourth IP packet is the same as the source IP address of the fourth IP packet, and a destination port number of the UDP packet corresponding to the fourth IP packet is the same as the source port number of the fourth IP packet. If the fourth IP packet satisfies the deception condition, the forwarding device uses the source IP address of the fourth IP packet as a used IP address; and adds, to the deception target set, the source port number of the fourth IP packet as an unopened port number on an IP address that is indicated by the source IP address of the fourth IP packet.

For example, the fourth IP packet is a RST packet. The forwarding device receives a RST packet whose source IP address is 1.1.1.103 and whose source port number is 80 at a moment A. Before one minute previous to the moment A, if the forwarding device receives a SYN packet whose destination address is 1.1.1.103 and whose destination port number is 80, and packets that are received within the one minute previous to the moment A and whose source IP addresses are 1.1.1.103 and whose source port numbers are 80 are RST packets, the forwarding device determines the port 80 on the IP address 1.1.1.103 as a deception target.

In other words, within the predetermined period of time after the forwarding device receives the SYN packet whose destination address is 1.1.1.103 and whose destination port number is 80, if all the received packets whose source IP addresses are 1.1.1.103 and whose source port numbers are 80 are RST packets, the forwarding device determines the port 80 on the IP address 1.1.1.103 as a deception target.

Based on the foregoing idea, the forwarding device may identify an unopened port on a used IP address in a plurality of manners. Optionally, the forwarding device establishes a SYN request table to identify a potential deception target, where the SYN request table is used to record a destination party that is requested to access and that has received a SYN packet but has not successfully established a connection.

The SYN request table includes one or more SYN entries. When receiving a SYN packet, the forwarding device queries whether there is a SYN entry that includes a combination of a destination IP address of the SYN packet and a destination port number of the SYN packet in the SYN request table. If there is a SYN entry that includes a combination of a destination IP address of the SYN packet and a destination port number of the SYN packet in the SYN request table, the forwarding device does not update the SYN request table. If there is no SYN entry that includes a combination of a destination IP address of the SYN packet and a destination port number of the SYN packet in the SYN request table, the forwarding device creates a SYN entry, where the SYN entry includes the combination of the destination IP address and the destination port number of the SYN packet. The SYN entry further includes a moment at which the SYN packet is received.

Optionally, each SYN entry in the SYN request table further includes a count value, used to record a quantity of received RST packets. When receiving a RST packet, the forwarding device queries whether there is a SYN entry that includes a combination of a source IP address of the RST packet and a source port number of the RST packet in the SYN request table. If there is the SYN entry that includes the combination of the source IP address of the RST packet and the source port number of the RST packet, the count value in the SYN entry is increased by 1.

In the following steps 507 to 512, a SYN request table is used as an example to describe how to identify an unopened port on a used IP address. It is clearly that, a manner of determining whether a port number satisfies the foregoing deception condition is not limited to the method shown in steps 507 to 512.

Step 507: The forwarding device queries the SYN request table based on the destination IP address and the destination port number of the fourth IP packet, and if there is no corresponding SYN entry, creates a SYN entry, and adds the SYN entry to the SYN table. The SYN entry includes the combination of the destination IP address of the SYN packet and the destination port number of the SYN packet.

For example, the established SYN request table is shown in Table 2.

TABLE 2

| Sequence number | IP address: Port number | Time |
| --- | --- | --- |
| 1 | 1.1.1.103: 80 | 2018 Jan. 20 23:12:01.23 |
| ... | ... | |

After step 507, the forwarding device performs step 506, to forward the fourth IP packet of a SYN type.

If the fourth IP packet is the SYN_ACK packet, it indicates that the fourth IP packet originates from an opened port on an online IP address. Therefore, neither the source address of the fourth IP packet nor the combination of the source address of the fourth IP packet and the source IP address of the fourth IP packet is a deception target. In this case, the deception target table and the SYN request table may be updated.

Step 508: When the fourth IP packet is the SYN_ACK packet, the forwarding device determines whether there is an entry that includes the source IP address or the combination of the source IP address of the fourth IP packet and the source port number of the fourth IP packet in the deception target table. If there is the entry that includes the source IP address or the combination of the source IP address of the fourth IP packet and the source port number of the fourth IP packet in the deception target table, the forwarding device performs step 509. If there is no entry that includes the source IP address or the combination of the source IP address of the fourth IP packet and the source port number of the fourth IP packet in the deception target table, the forwarding device performs step 510.

Step 509: The forwarding device deletes, from the deception target table, the entry that includes the source IP address or the combination of the source IP address and the source port number of the fourth IP packet.

Step 510: The forwarding device determines whether there is an entry that includes the combination of the source IP address and the source port number of the fourth IP packet in the SYN request table. If there is the entry that includes the combination of the source IP address and the source port number of the fourth IP packet in the SYN request table, the forwarding device performs step 511. If there is no entry that includes the source IP address of the fourth IP packet or the combination of the source IP address and the source port number of the fourth IP packet in the deception target table, the forwarding device performs step 506.

Step 511: The forwarding device deletes, from the SYN table, the entry that includes the combination of the source IP address and the source port number of the fourth IP packet.

If there is no entry that includes the combination of the source IP address and the source port number of the fourth IP packet in the SYN request table, or after the forwarding device deletes, from the SYN table, the entry that includes the combination of the source IP address and the source port number of the fourth IP packet, the forwarding device performs step 506.

If the fourth IP packet is the RST packet, it indicates that the IP packet may originate from an unopened port on an online IP address. In this case, the forwarding device determines, with reference to the SYN request table, whether a source port number of the RST packet satisfies the deception condition. When the deception condition is satisfied, the forwarding device adds the source port of the RST packet as a deception target. If the deception condition is not satisfied, the forwarding device updates an entry in the SYN request table.

Step 512: The forwarding device queries the SYN request table based on the source IP address and the source port number of the fourth IP packet. If the SYN request table includes an entry whose content is the same as the source IP address and the source port number of the IP packet, and a time difference between a time point in the entry and a time point at which the IP packet is received exceeds a specified threshold, the forwarding device performs step 513. If there is no entry whose content is the same as the source IP address and the source port number of the IP packet in the SYN request table, or a time difference between a time point in the entry and a time point at which the IP packet does not exceed a specified threshold, the forwarding device performs step 506.

Step 513: The forwarding device uses the source IP address of the fourth IP packet as a used IP address; and adds, to the deception target set, the source port number of the fourth IP packet as an unopened port number on an IP address that is indicated by the source IP address of the fourth IP packet. When the deception target table shown in Table 1 is used to indicate the deception target set, the forwarding device creates an entry, where the newly created entry includes the combination of the source IP address of the fourth IP packet and the source port number of the fourth IP packet, and adds the newly created entry to the deception target table.

Step 514: The forwarding device sends a SYN packet corresponding to the fourth IP packet of the RST type to the honeypot management server through the tunnel between the forwarding device and the honeypot management server. The corresponding SYN packet is a SYN packet whose destination IP address is the same as the source IP address of the fourth IP packet and whose destination port number is the same as the source port number of the fourth IP packet.

Optionally, the SYN packet that is sent by the forwarding device to the honeypot management server is a SYN packet that is previously received by the forwarding device and temporarily stored and that corresponds to the fourth IP packet of the RST type. Alternatively, the SYN packet that is sent by the forwarding device to the honeypot management server may be the SYN packet that corresponds to the fourth IP packet of the RST type and that is regenerated by the forwarding device when the forwarding device determines that the fourth IP packet satisfies the deception condition.

Because the ICMP unreachable packet and the RST packet have similar functions in notifying that the port requested to access does not exist, the foregoing processing procedure performed on the RST packet is also applicable to the ICMP unreachable packet.

Figure 6:
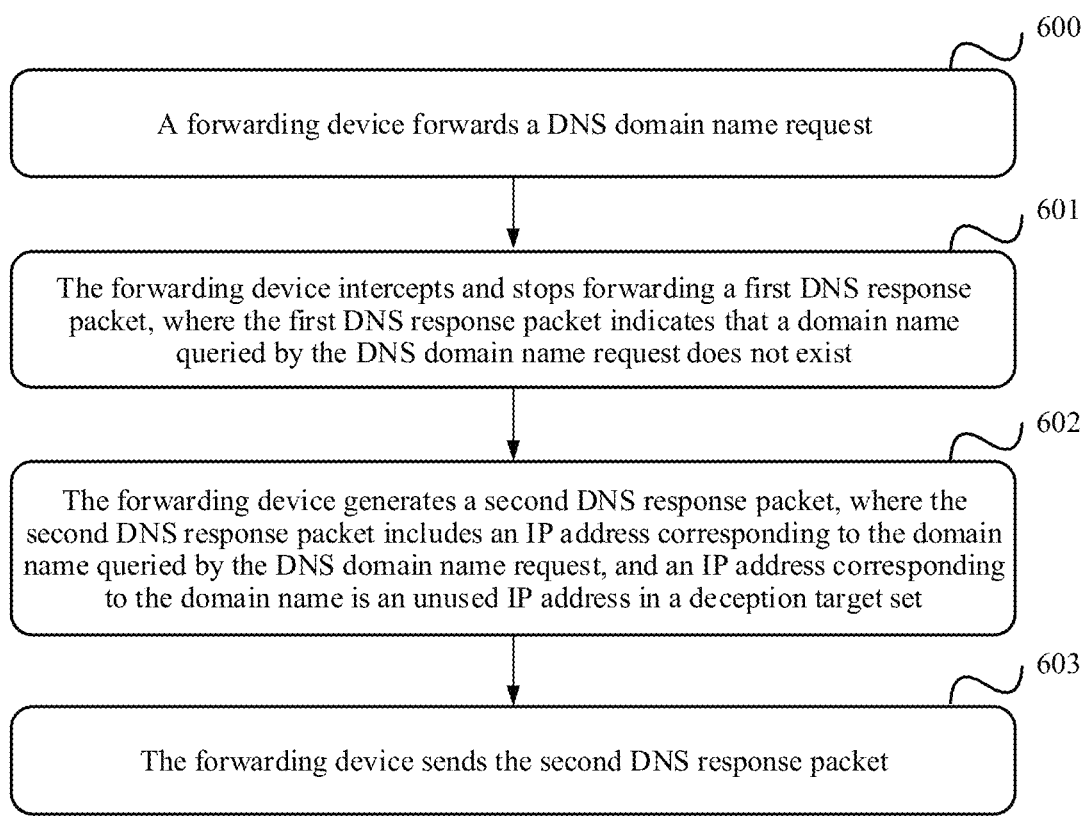
FIG. 6 is a flowchart of a solution to implementing deception during DNS resolution according to an embodiment of this application.

FIG. 6 is a flowchart of a method for actively implementing deception by using an IP address in a deception target set according to an embodiment of this application. In the method shown in FIG. 6, a solution to performing deception on network access behavior of a host by using the IP address in the deception target set in a DNS resolution process is mainly described. Optionally, in the method shown in FIG. 6, the IP address in the deception target set is obtained by using the method shown in FIG. 3A-1 and FIG. 3A-2 or FIG. 5A to FIG. 5C to perform deception.

Optionally, a procedure shown in FIG. 6 is performed after step 201 and before step 202 in FIG. 2.

Step 600: A forwarding device forwards a DNS domain name request.

Step 601: The forwarding device intercepts and stops forwarding a first DNS response packet, where the first response packet indicates that a domain name queried by the DNS domain name request does not exist.

When a host wants to access an unknown domain name of an IP address, the host sends a DNS query packet to a DNS server on a network based on an IP address of the DNS server that is configured on the host. The DNS query packet includes a domain name to be accessed, for example, http://www.baidu.com/. The DNS server returns a corresponding DNS response packet to the host. If the DNS server obtains, through querying, an IP address corresponding to the requested domain name http://www.baidu.com/ from a DNS database, the DNS response packet carries the IP address obtained through querying. If there is no requested domain name in the DNS database, the DNS response packet indicates that the domain name does not exist. For example, a value of an RCODE field in a message header of the DNS response packet is set to 3, it indicates that the requested domain name does not exist.

Optionally, after intercepting the first DNS response packet, the forwarding device discards the first DNS response packet.

Step 602: The forwarding device generates a second DNS response packet, where the second DNS response packet includes an IP address corresponding to the domain name queried by the DNS domain name request, and the IP address corresponding to the domain name is an unused IP address in the deception target set.

Optionally, the forwarding device buffers the DNS domain name request before receiving the first DNS response packet, and generates the second DNS response packet based on the DNS domain name request after receiving the first DNS response packet. To save storage space, the forwarding device may not buffer the DNS domain name request, but generate the second DNS response packet based on the first DNS response packet after receiving the first DNS response packet, where address information of the second DNS response packet is the same as address information of the first DNS response packet, and the second DNS response packet indicates that an IP address corresponding to the queried domain name is an IP address in the deception target set. The address information includes a source IP address, a source port number, a destination IP address, and a destination port number. The forwarding device resets content of some fields in the first DNS response packet, to generate the second DNS response packet. The forwarding device sets the value of the RCODE field to 1, to indicate that no error occurs during querying, and sets content of an RDATA field recorded in an answer resource of the first DNS response packet to an IP address in the deception target set, so as to obtain the second DNS response packet.

Step 603: The forwarding device sends the second DNS response packet.

Then, a host that receives the second DNS response packet subsequently initiates access by using, as a destination party that is requested to access, the IP address in the deception target set that is carried in the second DNS response packet. The forwarding device sends, to the honeypot management server through a tunnel, a packet that is subsequently sent by the host to the deception target, so as to deceive network access behavior of the host.

In this embodiment of this application, the forwarding device deceives the network access behavior of the host by using the IP address in the deception target set in the DNS resolution process, so as to actively deceive DNS probing behavior of a potential attacker. This helps a cyber threat deception system achieve better deception effects.

Figure 7:
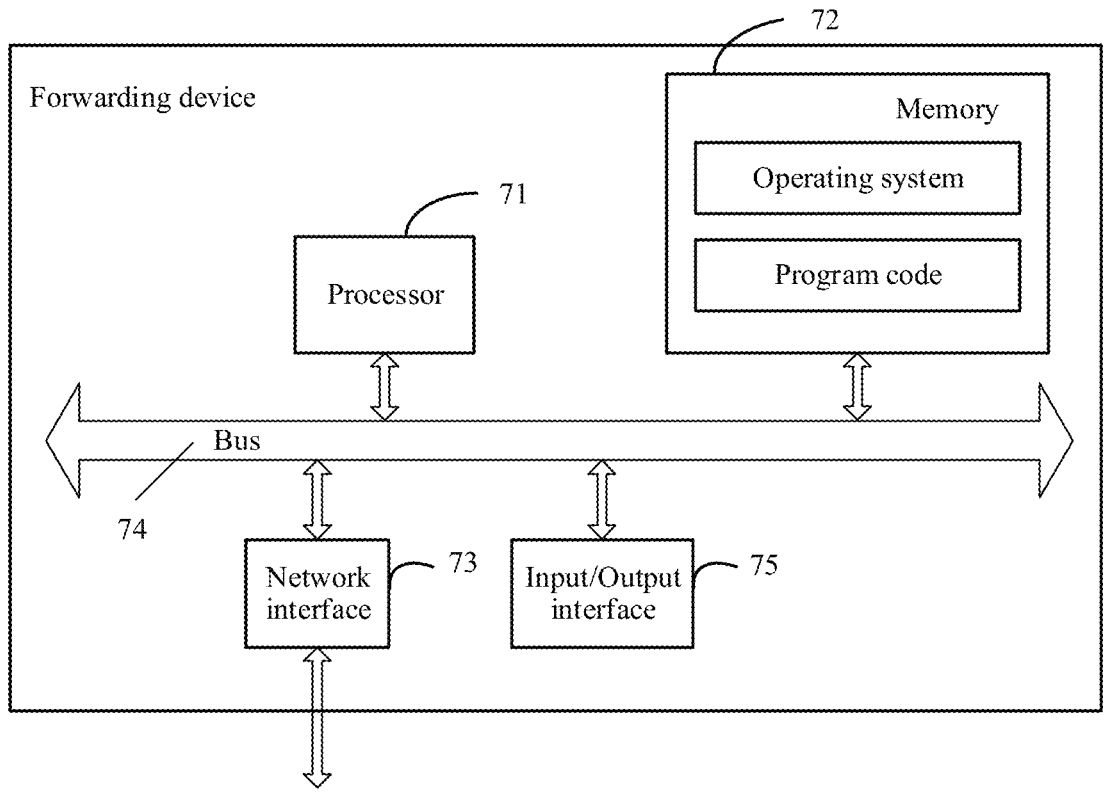
FIG. 7 is a schematic structural diagram of a forwarding device according to an embodiment of this application.

FIG. 7 is a schematic structural diagram of a forwarding device according to an embodiment of this application. The forwarding device shown in FIG. 7 is used as a network device in the procedure shown in FIG. 2, FIG. 3A-1 and FIG. 3A-2, FIG. 3B, FIG. 4A and FIG. 4B, FIG. 5A to FIG. 5C, or FIG. 6, to implement functions of the forwarding device in FIG. 1. The forwarding device includes at least one processor 71 and a network interface 73. Optionally, the forwarding device further includes a memory 72. The processor 71, the memory 72, and the network interface 73 are typically connected to each other through a bus 74, or may be connected to each other in another manner, for example, through a switching network adapter.

The at least one processor 71 may be one or more CPUs, and the CPU may be a single-core CPU, or may be a multi-core CPU.

The memory 72 includes but is not limited to a random access memory (RAM), a read-only memory (ROM), an erasable programmable read-only memory (EPROM), a ternary content addressable memory (TCAM), a flash memory, an optical memory, or the like. The memory 72 stores code of an operating system.

The network interface 73 may be a wired interface, for example, a fiber distributed data interface (FDDI), a gigabit Ethernet (GE) interface. Alternatively, the network interface 73 may be a wireless interface. The network interface 73 is configured to receive or send a packet. The packet includes but is not limited to the ARP packet, the IP packet, or the ICMP packet described in the foregoing embodiments.

Optionally, the processor 71 implements the method in the foregoing embodiment by reading program code stored in the memory 72, or the processor 71 may implement the method in the foregoing embodiment by executing an instruction stored in the processor 71. When the processor 71 implements the method in the foregoing embodiment by reading the program code stored in the memory 72, the memory 72 stores the program code for implementing the method provided in the foregoing embodiment of this application.

The processor 71 is configured to read the program code stored in the memory 32, to perform the following operations: obtaining a deception target set, where the deception target set includes at least one deception target, and the at least one deception target includes an unused IP address or an unopened port number on a used IP address.

The network interface 73 is configured to receive a first IP packet from a first host.

The processor 71 is further configured to determine whether a destination party that the first IP packet requests to access belongs to the deception target set.

The network interface 73 is further configured to: if the destination party that the first IP packet requests to access belongs to the deception target set, send the first IP packet to a honeypot management server; receive a second IP packet returned by the honeypot management server, where the second IP packet is a response packet of the first IP packet; and send the second IP packet to the first host.

For more details of implementing the foregoing functions by the network interface 73 or the processor 71, refer to the descriptions in the foregoing method embodiments. Details are not described herein again.

Optionally, the forwarding device further includes an input/output interface 75. The input/output interface 75 is configured to: connect to an input device, and receive configuration information input by a user through the input device. The input device includes but is not limited to a keyboard, a touchscreen, a microphone, and the like. The input/output interface 75 is further configured to connect to an output device, and output the deception target set that is determined by the processor 71. The output device includes but is not limited to a display, a printer, and the like.

Figure 8:
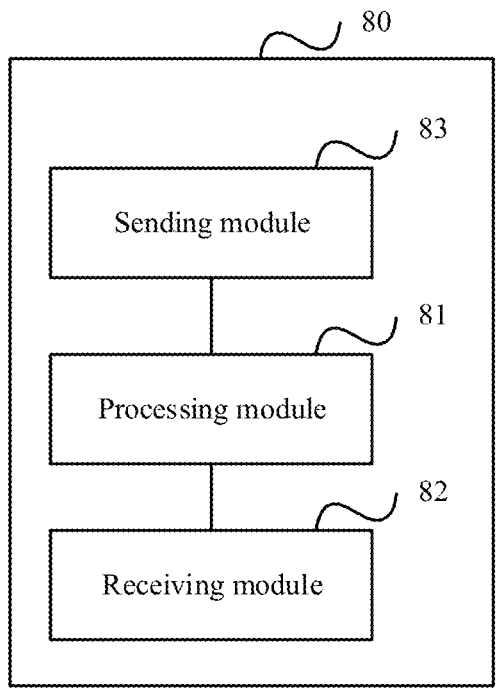
FIG. 8 is a schematic structural diagram of a cyber threat deception apparatus according to an embodiment of this application.

FIG. 8 is a schematic structural diagram of a cyber threat deception apparatus according to an embodiment of this application. The cyber threat deception apparatus 80 includes a processing module 81, a receiving module 82, and a sending module 83.

The processing module 81 is configured to obtain a deception target set, where the deception target set includes at least one deception target, and the at least one deception target includes an unused IP address or an unopened port number on a used IP address.

The receiving module 82 is configured to receive a first IP packet from a first host.

The processing module 81 is further configured to determine whether a destination party that the first IP packet requests to access belongs to the deception target set.

The sending module 83 is configured to: if the destination party that the first IP packet requests to access belongs to the deception target set, send the first IP packet to a honeypot management server.

The receiving module 82 is further configured to receive a second IP packet returned by the honeypot management server, where the second IP packet is a response packet of the first IP packet.

The sending module 83 is further configured to send the second IP packet to the first host.

Optionally, the receiving module 82 is further configured to receive a first ARP packet, where the first ARP packet is an ARP request packet.

The processing module 81 is further configured to: determine an online status of a destination IP address of the first ARP packet based on an IP address status table, where the IP address status table is used to indicate online statuses one-to-one corresponding to a plurality of IP addresses within a range of a subnet connected to the cyber threat deception apparatus, and the online status is online or offline; and if the online status of the destination IP address of the first ARP packet is offline, add, to the deception target set, the destination IP address of the first ARP request packet as an unused IP address.

Optionally, the receiving module 82 is further configured to receive a second ARP packet, where the second ARP packet is an ARP reply packet or a gratuitous ARP packet. The processing module 81 is further configured to: determine whether the deception target set includes a source IP address of the second ARP packet; and if the deception target set includes the source IP address of the second ARP packet, delete, from the deception target set, the source IP address that is of the second ARP packet and that is used as an unused IP address.

Optionally, the receiving module 82 is further configured to receive a third IP packet. The processing module 81 is further configured to query, based on a destination IP address of the third IP packet, a routing table of the cyber threat deception apparatus for a next-hop IP address corresponding to the third IP packet; and if there is no next-hop IP address corresponding to the third IP packet in the routing table, add, to the deception target set, the destination IP address of the third IP packet as an unused IP address.

Optionally, the processing module 81 is further configured to: if there is a next-hop IP address corresponding to the third IP packet in the routing table, query an ARP table for a MAC address corresponding to the next-hop IP address; if there is no MAC address corresponding to the next-hop IP address in the ARP table, determine an online status of the destination IP address of the third IP packet based on an IP address status table, where the IP address status table is used to indicate online statuses one-to-one corresponding to a plurality of IP addresses within a range of at least one subnet connected to the cyber threat deception apparatus, and the online status is online or offline; and if there is no MAC address corresponding to the next-hop IP address in the ARP table and the online status of the destination IP address of the third IP packet is offline, add, to the deception target set, the destination IP address of the third IP packet as an unused IP address.

Optionally, the receiving module 82 is further configured to receive a fourth IP packet, where the fourth IP packet is a RST packet. The processing module 81 is further configured to determine whether the fourth IP packet satisfies a deception condition, where the deception condition includes: Before the fourth IP packet is received, at least one SYN packet corresponding to the fourth IP packet is received, where a destination IP address of the SYN packet corresponding to the fourth IP packet is the same as a source IP address of the fourth IP packet, and a destination port number of the SYN packet corresponding to the fourth IP packet is the same as a source port number of the fourth IP packet; and if the fourth IP packet satisfies the deception condition, use the source IP address of the fourth IP packet as a used IP address, and add, to the deception target set, the source port number of the fourth IP packet as an unopened port number on an IP address that is indicated by the source IP address of the fourth IP packet.

Optionally, the receiving module 82 is further configured to receive a fourth IP packet, where the fourth IP packet is an ICMP unreachable packet. The processing module 81 is further configured to determine whether the fourth IP packet satisfies a deception condition, where the deception condition includes: Before the fourth IP packet is received, at least one UDP packet corresponding to the fourth IP packet is received, where a destination IP address of the UDP packet corresponding to the fourth IP packet is the same as a source IP address of the fourth IP packet, and a destination port number of the UDP packet corresponding to the fourth IP packet is the same as a source port number of the fourth IP packet. If the fourth IP packet satisfies the deception condition, the processing module 81 uses the source IP address of the fourth IP packet as a used IP address; and adds, to the deception target set, the source port number of the fourth IP packet as an unopened port number on an IP address that is indicated by the source IP address of the fourth IP packet.

Optionally, the receiving module 82 is further configured to receive a fourth IP packet, where the fourth IP packet is a SYN-ACK packet. The processing module 81 is further configured to: determine whether the deception target set includes a to-be-deleted deception target, where the to-be-deleted deception target is an unopened port number on a used IP address, the used IP address is a source IP address of the fourth IP packet, and the unopened port number is a port number indicated by a source port number of the fourth IP packet; and if the deception target set includes the to-be-deleted deception target, delete the to-be-deleted deception target from the deception target set.

Optionally, the receiving module 82 and the sending module 83 are further configured to forward a DNS domain name request. The receiving module 82 is further configured to intercept and stop forwarding a first DNS response packet, where the first DNS response packet is a response packet of the DNS domain name request, and the first DNS response packet indicates that a domain name queried by the DNS domain name request does not exist. The processing module 81 is further configured to generate a second DNS response packet, where the second DNS response packet includes an IP address corresponding to the domain name queried by the DNS domain name request, and the IP address corresponding to the domain name is an unused IP address in the deception target set. The sending module 83 is further configured to send the second DNS response packet.

The apparatus embodiment shown in FIG. 8 is merely an example. For example, the module division is merely logical function division and may be other division in an actual implementation. For example, a plurality of modules or components may be combined or integrated into another system, or some features may be ignored or not performed. Function modules in the embodiments of this application may be integrated into one processing module, or each of the modules may exist alone physically, or two or more modules are integrated into one module. The foregoing modules in FIG. 8 may be implemented in a form of hardware, or may be implemented in a form of a software functional unit. For example, when software is used for implementation, the receiving module 82, the processing module 81, and the sending module 83 may be implemented by a software functional module generated after the CPU in FIG. 7 reads the program code stored in the memory. The foregoing modules in FIG. 8 may alternatively be implemented by different hardware in the forwarding device. For example, the receiving module 82 and the sending module 83 are implemented by the network interface 73 in FIG. 7, and the processing module 81 is implemented by the processor 71 in FIG. 7, or a programmable component such as a field-programmable gate array (FPGA) or a coprocessor. It is clearly that the foregoing functional module may be alternatively implemented by using a combination of software and hardware. For example, the receiving module 82 and the sending module 83 are implemented by using a hardware programmable device, and the processing module 81 is implemented by a software functional module generated after a CPU reads program code stored in the memory.

For more details about implementing the foregoing functions by the processing module 81, the receiving module 82, and the sending module 83 in FIG. 8, refer to the descriptions in the foregoing method embodiments. Details are not described herein again.

The embodiments in this specification are all described in a progressive manner. For same or similar parts in the embodiments, reference may be made to these embodiments, and each embodiment focuses on a difference from other embodiments. Especially, a system embodiment is basically similar to a method embodiment, and therefore is described briefly. For related parts, refer to descriptions in the method embodiment.

All or some of the foregoing embodiments may be implemented by using software, hardware, firmware, or any combination thereof in the foregoing embodiments. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It is clearly that a person skilled in the art can make various modifications and variations to this application without departing from the scope of this application. This application is intended to cover these modifications and variations provided that they fall within the scope of protection defined by the following claims.

What is claimed is:

1. A cyber threat deception method, comprising:
obtaining, by a forwarding device, a deception target set, wherein the deception target set comprises at least one deception target, and the at least one deception target comprises an unused internet protocol (IP) address or an unopened port number on a used IP address, wherein the obtaining the deception target set comprises:
receiving a third IP packet;
querying, by the forwarding device based on a destination IP address of the third IP packet, a routing table of the forwarding device for a next-hop IP address corresponding to the third IP packet; and
when no next-hop IP address corresponding to the third IP packet is in the routing table, adding, by the forwarding device to the deception target set, the destination IP address of the third IP packet as an unused IP address;
receiving, by the forwarding device, a first IP packet from a first host;
determining, by the forwarding device, whether a destination party that the first IP packet requests to access belongs to the deception target set;
when the destination party that the first IP packet requests to access belongs to the deception target set, sending, by the forwarding device, the first IP packet to a honeypot management server;
receiving, by the forwarding device, a second IP packet from the honeypot management server, wherein the second IP packet is a response packet of the first IP packet; and
sending, by the forwarding device, the second IP packet to the first host.

2. The method according to claim 1, further comprising:
when no next-hop IP address corresponding to the third IP packet is in the routing table, sending, by the forwarding device, the third IP packet to the honeypot management server; and
receiving, by the forwarding device from the honeypot management server, a response packet of the third IP packet, and forwarding the response packet.

3. The method according to claim 1, further comprising:
when a next-hop IP address corresponding to the third IP packet is in the routing table, querying, by the forwarding device, an Address Resolution Protocol (ARP) table for a media access control (MAC) address corresponding to the next-hop IP address;
when no MAC address corresponding to the next-hop IP address is in the ARP table, determining, by the forwarding device, an online status of the destination IP address of the third IP packet based on an IP address status table, wherein the IP address status table is used to indicate online statuses one-to-one corresponding to a plurality of IP addresses within a range of at least one subnet connected to the forwarding device, and the online status is online or offline; and
when no MAC address corresponding to the next-hop IP address is in the ARP table and the online status of the destination IP address of the third IP packet is offline, adding, by the forwarding device to the deception target set, the destination IP address of the third IP packet as an unused IP address.

4. The method according to claim 3, further comprising:
when no MAC address corresponding to the next-hop IP address is in the ARP table and the online status of the destination IP address of the third IP packet is offline, sending the third IP packet to the honeypot management server; and
receiving, from the honeypot management server, a response packet of the third IP packet, and forwarding the response packet.

5. The method according to claim 3, wherein the IP address status table is obtained by performing the following steps:
sending, by the forwarding device, an ARP request packet for each of the plurality of IP addresses within the range of the subnet connected to the forwarding device; and
when the forwarding device does not receive an ARP reply packet of a first IP address, adding the first IP address to the IP address status table, wherein the first IP address is an IP address of the plurality of IP addresses; and
setting a status of the first IP address to offline.

6. The method according to claim 5, further comprising:
receiving, by the forwarding device, an ARP reply packet of a second IP address, wherein the second IP address is an IP address of the plurality of IP addresses;
adding the second IP address to the IP address status table; and
setting a status of the second IP address to online.

7. The method according to claim 1, wherein the obtaining the deception target set comprises:
receiving, by the forwarding device, a fourth IP packet, wherein the fourth IP packet is a connection reset (RST) packet;
determining whether the fourth IP packet satisfies a deception condition, wherein the deception condition comprises:
before the fourth IP packet is received, at least one connection establishment (SYN) packet corresponding to the fourth IP packet is received, wherein a destination IP address of the SYN packet is same as a source IP address of the fourth IP packet, and a destination port number of the SYN packet is same as a source port number of the fourth IP packet; and
when the fourth IP packet satisfies the deception condition, adding, by the forwarding device to the deception target set, the source port number of the fourth IP packet as an unopened port number on a used IP address, wherein the used IP address is the source IP address of the fourth IP packet.

8. The method according to claim 1, wherein the obtaining the deception target set comprises:
receiving, by the forwarding device, a fourth IP packet, wherein the fourth IP packet is a RST packet;
determining whether the fourth IP packet satisfies a deception condition, wherein the deception condition comprises:
at least one SYN packet corresponding to the fourth IP packet is received previous to a predetermined period of time that is before the fourth IP packet is received, and one or more packets that is or that are received within the predetermined period of time and that has or that have a same source IP address and a same source port number as the fourth IP packet is or are all RST packets or internet control message protocol (ICMP) unreachable packets, wherein a destination IP address of the SYN packet corresponding to the fourth IP packet is same as a source IP address of the fourth IP packet, and a destination port number of the SYN packet corresponding to the fourth IP packet is same as a source port number of the fourth IP packet; and when the fourth IP packet satisfies the deception condition, adding, by the forwarding device to the deception target set, the source port number of the fourth IP packet as an unopened port number on a used IP address, wherein the used IP address is the source IP address of the fourth IP packet.

9. The method according to claim 8 further comprising:
when the fourth IP packet satisfies the deception condition, sending the SYN packet corresponding to the fourth IP packet to the honeypot management server; and
receiving, from the honeypot management server, a response packet of the SYN packet, and forwarding the response packet of the SYN packet to the first host.

10. The method according to claim 1, wherein the obtaining the deception target set comprises:
receiving, by the forwarding device, a fourth IP packet, wherein the fourth IP packet is an ICMP unreachable packet;
determining whether the fourth IP packet satisfies a deception condition, wherein the deception condition comprises:
before the fourth IP packet is received, at least one user datagram protocol (UDP) packet corresponding to the fourth IP packet is received, wherein a destination IP address of the UDP packet is same as a source IP address of the fourth IP packet, and a destination port number of the UDP packet is same as a source port number of the fourth IP packet; and
when the fourth IP packet satisfies the deception condition, adding, by the forwarding device to the deception target set, the source port number of the fourth IP packet as an unopened port number on a used IP address, wherein the used IP address is the source IP address of the fourth IP packet.

11. The method according to claim 1, further comprising:
receiving, by the forwarding device, a fourth IP packet, wherein the fourth IP packet is a connection establishment acknowledgment SYN-ACK packet;
determining, by the forwarding device, whether the deception target set comprises a to-be-deleted deception target, wherein the to-be-deleted deception target is an unopened port number on a used IP address, the used IP address is a source IP address of the fourth IP packet, and the unopened port number is a source port number of the fourth IP packet; and
when the deception target set comprises the to-be-deleted deception target, deleting, by the forwarding device, the to-be-deleted deception target from the deception target set.

12. The method according to claim 1, further comprising:
forwarding, by the forwarding device, a domain name system (DNS) domain name request;
intercepting and stopping forwarding, by the forwarding device, a first DNS response packet, wherein the first DNS response packet is a response packet of the DNS domain name request, and the first DNS response packet indicates that a domain name queried by the DNS domain name request does not exist;
generating, by the forwarding device, a second DNS response packet, wherein the second DNS response packet comprises an IP address corresponding to the domain name queried by the DNS domain name request, and the IP address corresponding to the domain name is an unused IP address in the deception target set; and
sending, by the forwarding device, the second DNS response packet.

13. A forwarding device, comprising:
a network interface; and
at least one processor coupled to the network interface, wherein
the at least one processor is configured to:
obtain a deception target set, wherein the deception target set comprises at least one deception target, and the at least one deception target comprises an unused internet protocol (IP) address or an unopened port number on a used IP address, wherein the network interface is configured to receive a third IP packet, and the at least one processor is configured to:
query, based on a destination IP address of the third IP packet, a routing table of the forwarding device for a next-hop IP address corresponding to the third IP packet; and
when no next-hop IP address corresponding to the third IP packet is in the routing table, add, to the deception target set, the destination IP address of the third IP packet as an unused IP address;
the network interface is configured to receive a first IP packet from a first host;
the at least one processor is further configured to determine whether a destination party that the first IP packet requests to access belongs to the deception target set; and
the network interface is configured to:
when the destination party that the first IP packet requests to access belongs to the deception target set, send the first IP packet to a honeypot management server;
receive a second IP packet from the honeypot management server, wherein the second IP packet is a response packet of the first IP packet; and
send the second IP packet to the first host.

14. The forwarding device according to claim 13, wherein the at least one processor is further configured to:
when a next-hop IP address corresponding to the third IP packet is in the routing table, query, an Address Resolution Protocol (ARP) table for a media access control (MAC) address corresponding to the next-hop IP address;
when no MAC address corresponding to the next-hop IP address is in the ARP table, determine an online status of the destination IP address of the third IP packet based on an IP address status table, wherein the IP address status table is used to indicate online statuses one-to-one corresponding to a plurality of IP addresses within a range of at least one subnet connected to the forwarding device, and the online status is online or offline; and
when no MAC address corresponding to the next-hop IP address is in the ARP table and the online status of the destination IP address of the third IP packet is offline, add, to the deception target set, the destination IP address of the third IP packet as an unused IP address.

15. The forwarding device according to claim 13, wherein the network interface is further configured to:
receive a fourth IP packet, wherein the fourth IP packet is a connection reset RST packet; and
the at least one processor is further configured to determine whether the fourth IP packet satisfies a deception condition, wherein the deception condition comprises:
before the fourth IP packet is received, at least one connection establishment (SYN) packet corresponding to the fourth IP packet is received, wherein a destination IP address of the SYN packet corresponding to the fourth IP packet is same as a source IP address of the fourth IP packet, and a destination port number of the SYN packet corresponding to the fourth IP packet is same as a source port number of the fourth IP packet; and,
when the fourth IP packet satisfies the deception condition, add, to the deception target set, the source port number of the fourth IP packet as an unopened port number on a used IP address, wherein the used IP address is the source IP address of the fourth IP packet.

16. The forwarding device according to claim 13, wherein the network interface is further configured to:
receive a fourth IP packet, wherein the fourth IP packet is an internet control message protocol (ICMP) unreachable packet; and
the at least one processor is further configured to determine whether the fourth IP packet satisfies a deception condition, wherein the deception condition comprises:
before the fourth IP packet is received, at least one user datagram protocol (UDP) packet corresponding to the fourth IP packet is received, wherein a destination IP address of the UDP packet corresponding to the fourth IP packet is the same as a source IP address of the fourth IP packet, and a destination port number of the UDP packet corresponding to the fourth IP packet is same as a source port number of the fourth IP packet, and
wherein the at least one processor is configured to, when the fourth IP packet satisfies the deception condition, add, to the deception target set, the source port number of the fourth IP packet as an unopened port number on a used IP address, wherein the used IP address is the source IP address of the fourth IP packet.

17. The forwarding device according to claim 13, wherein the network interface is further configured to:
forward a DNS domain name request;
intercept and stop forwarding a first DNS response packet, wherein the first DNS response packet is a response packet of the DNS domain name request, and the first DNS response packet indicates that a domain name queried by the DNS domain name request does not exist,
wherein the at least one processor is further configured to generate a second DNS response packet, wherein the second DNS response packet comprises an IP address corresponding to the domain name queried by the DNS domain name request, and the IP address corresponding to the domain name is an unused IP address in the deception target set, and
wherein the network interface is further configured to send the second DNS response packet.

18. A cyber threat deception system, comprising:
a honeypot management server; and
at least one forwarding device coupled to the honeypot management server,
wherein the at least one forwarding device is configured to
obtain a deception target set, wherein the deception target set comprises at least one deception target, and the at least one deception target comprises an unused internet protocol (IP) address or an unopened port number on a used IP address, wherein the at least one forwarding device is configured to:
receive a third IP packet;
query, based on a destination IP address of the third IP packet, a routing table of the at least one forwarding device for a next-hop IP address corresponding to the third IP packet; and
when no next-hop IP address corresponding to the third IP packet is in the routing table, add, to the deception target set, the destination IP address of the third IP packet as an unused IP address;
receive a first IP packet from a first host;
determine whether a destination party that the first IP packet requests to access belongs to the deception target set;
when the destination party that the first IP packet requests to access belongs to the deception target set, send the first IP packet to a honeypot management server;
receive a second IP packet returned by the honeypot management server, wherein the second IP packet is a response packet of the first IP packet; and
send the second IP packet to the first host.

19. The cyber threat deception system according to claim 18, wherein the at least one forwarding device is configured to:
when no next-hop IP address corresponding to the third IP packet is in the routing table, send the third IP packet to the honeypot management server; and
receive, from the honeypot management server, a response packet of the third IP packet, and forwarding the response packet.

20. The cyber threat deception system according to claim 18, wherein the at least one forwarding device is configured to:
when a next-hop IP address corresponding to the third IP packet is in the routing table, query an Address Resolution Protocol (ARP) table for a media access control (MAC) address corresponding to the next-hop IP address;
when no MAC address corresponding to the next-hop IP address is in the ARP table, determine an online status of the destination IP address of the third IP packet based on an IP address status table, wherein the IP address status table is used to indicate online statuses one-to-one corresponding to a plurality of IP addresses within a range of at least one subnet connected to the at least one forwarding device, and the online status is online or offline; and
when no MAC address corresponding to the next-hop IP address is in the ARP table and the online status of the destination IP address of the third IP packet is offline, add, to the deception target set, the destination IP address of the third IP packet as an unused IP address.

* * * * *